US012416929B2

(12) United States Patent
Rysdyk et al.

(10) Patent No.: US 12,416,929 B2
(45) Date of Patent: Sep. 16, 2025

(54) LANDING A VERTICAL LANDING VEHICLE

(71) Applicant: Insitu, Inc., Bingen, WA (US)

(72) Inventors: Rolf Rysdyk, Hood River, OR (US); Joseph Jackson, White Salmon, WA (US); Jeffrey Decker, Snowden, WA (US)

(73) Assignee: The Boeing Company, Chicago, IL (US)

( * ) Notice: Subject to any disclaimer, the term of this patent is extended or adjusted under 35 U.S.C. 154(b) by 556 days.

(21) Appl. No.: 17/456,834

(22) Filed: Nov. 29, 2021

(65) Prior Publication Data

US 2022/0197307 A1    Jun. 23, 2022

Related U.S. Application Data

(60) Provisional application No. 63/127,937, filed on Dec. 18, 2020.

(51) Int. Cl.
| | | |
|---|---|---|
| *G05D 1/485* | (2024.01) | |
| *G05D 1/654* | (2024.01) | |
| *G05D 109/25* | (2024.01) | |

(52) U.S. Cl.
CPC ........... *G05D 1/485* (2024.01); *G05D 1/6545* (2024.01); *G05D 2109/25* (2024.01)

(58) Field of Classification Search
CPC ........ G05D 1/485; G05D 1/6545; G05D 1/00; G08G 5/00; B64U 70/40
USPC ...................................................... 701/2–18
See application file for complete search history.

(56) References Cited

U.S. PATENT DOCUMENTS

| | | | | |
|---|---|---|---|---|
| 11,029,709 | B1* | 6/2021 | Stepanyan | G05D 1/1062 |
| 2009/0214080 | A1* | 8/2009 | Hamza | G06T 7/11 |
| | | | | 382/103 |
| 2012/0265374 | A1* | 10/2012 | Yochum | G05D 1/0607 |
| | | | | 701/5 |
| 2015/0291277 | A1* | 10/2015 | Kubik | G05D 1/0858 |
| | | | | 701/3 |
| 2017/0212529 | A1* | 7/2017 | Kumar | G01S 19/48 |
| 2017/0308099 | A1* | 10/2017 | Kim | G01S 7/521 |
| 2017/0322069 | A1* | 11/2017 | Mastrianni | B64C 25/001 |
| 2019/0061940 | A1* | 2/2019 | Tai | B64U 50/38 |
| 2019/0215495 | A1* | 7/2019 | Smolyanskiy | G05D 1/0094 |

(Continued)

OTHER PUBLICATIONS

T. Rakgowa, E. K. Wong, K. S. Sim and M. E. Nia, "Minimal jerk trajectory for quadrotor VTOL procedure," 2015 IEEE International Symposium on Robotics and Intelligent Sensors (IRIS), Langkawi, Malaysia, 2015, pp. 284-287, doi: 10.1109/IRIS.2015.7451626. (Year: 2015).*

(Continued)

*Primary Examiner* — Erin M Piateski
*Assistant Examiner* — Paul Allen
(74) *Attorney, Agent, or Firm* — Yee & Associates, P.C.

(57) ABSTRACT

A method, apparatus, system, and computer program product for controlling landing of a vertical landing vehicle. In one illustrative example, a method controls landing of a vertical landing vehicle. A landing profile for landing the vertical landing vehicle is determined by the computer system using a third derivative of a position equation, an initial position, an initial speed, a final speed, and a touchdown point for the vertical landing vehicle. Landing of the vertical landing vehicle is controlled using the landing profile.

20 Claims, 10 Drawing Sheets

(56) References Cited

U.S. PATENT DOCUMENTS

2019/0250640 A1     8/2019   OFlaherty et al.
2020/0012296 A1*   1/2020   Gurdan ................ G05D 1/0676

OTHER PUBLICATIONS

E. Tal and S. Karaman, "Accurate Tracking of Aggressive Quadrotor Trajectories Using Incremental Nonlinear Dynamic Inversion and Differential Flatness," Jun. 2020, arXiv:1809.04048v2 (Year: 2020).*
Fourth, fifth, and sixth derivatives of position—Wikipedia; captured via archive.org, Nov. 1, 2020 (Year: 2020).*
A. Paris, B. T. Lopez and J. P. How, "Dynamic Landing of an Autonomous Quadrotor on a Moving Platform in Turbulent Wind Conditions," 2020 IEEE International Conference on Robotics and Automation (ICRA), Paris, France, 2020, pp. 9577-9583, doi: 10.1109/ICRA40945.2020.9197081. (Year: 2020).*
Kyriakopoulos et al., Minimum jerk for trajectory planning and control, Robotica, vol. 12, No. 2, Mar. 1994, pp. 109-113.
Mellinger et al., "Minimum snap trajectory generation and control for quadrotors," 2011 IEEE International Conference on Robotics and Automation, May 2011, pp. 2520-2525.
Mueller et al., "A Computationally Efficient Motion Primitive for Quadrocopter Trajectory Generation," IEEE Transactions on Robotics, vol. 31, No. 6, Dec. 2015, pp. 1294-1310.
Extended European Search Report (EESR) dated May 6, 2022, regarding Application No. EP 21214306, 9 pages.

* cited by examiner

LANDING A VERTICAL LANDING VEHICLE

This application is related to and claims the benefit of priority of provisional U.S. Patent Application Ser. No. 63/127,937 entitled "LANDING A VERTICAL LANDING VEHICLE", filed on Dec. 18, 2020, which is hereby incorporated by reference.

BACKGROUND INFORMATION

1. Field

The present disclosure relates generally to aircraft and, in particular, to vertical landing vehicles, such as vertical take-off and landing (VTOL) vehicles. Still more particularly, the present disclosure relates to a method, apparatus, and system for managing a vertical landing vehicle.

2. Background

Vertical take-off and landing (VTOL) vehicles are vehicles that can take-off and land vertically. VTOL vehicles can also hover. Vertical take-off and landing vehicles can include various types of aircraft. For example, vertical take-off and landing vehicles can include fixed wing aircraft, helicopters, tiltrotors, and cyclocopters.

Hybrid vertical take-off and landing vehicles can operate in multiple modes. For example, a hybrid vertical take-off and landing vehicle may also have a fixed wing enabling the hybrid vertical take-off and landing vehicle to fly for longer periods of time and cover more ground as compared to more traditional multi-rotor unmanned aerial vehicles.

Landing a vertical landing vehicle, such as a vertical take-off and landing (VTOL) vehicle, can be challenging. For example, if the propulsion units are turned off too quickly or the rotors are slowed down prior to the vertical take-off and landing vehicle has landed, the vertical take-off and landing vehicle may drop straight to the ground, tilt, or drift in an undesired manner. The incidence of tilting or drifting in these situations can increase when turbulence or aerodynamic ground effects are encountered during landing.

Therefore, it would be desirable to have a method and apparatus that take into account at least some of the issues discussed above, as well as other possible issues. For example, it would be desirable to have a method and apparatus that overcome a technical problem with landing a vertical take-off and landing vehicle.

SUMMARY

An example of the present disclosure provides a vertical landing system. The vertical take-off and landing system comprises a sensor system, a computer system, and a landing manager. The sensor system is configured to generate a landing signal when landing of the vertical landing vehicle is detected by the sensor system. The landing manager is located in the computer system. The landing manager is configured to determine a landing profile for landing the vertical landing vehicle using a third derivative of a position equation, an initial position, an initial speed, a final speed, and a touchdown point for the vertical landing vehicle. A jerk is reduced in landing the vertical landing vehicle at the touchdown point. The landing manager is configured to perform a set of actions when the landing signal is received from the sensor system and when the vertical landing vehicle reaches the touchdown point.

Another example of the present disclosure provides a vertical landing system comprising a computer system and a landing manager in the computer system. The landing manager is configured to determine a landing profile for landing a vertical landing vehicle using a third derivative of a position equation, an initial position, an initial speed, a final speed, and a touchdown point for the vertical landing vehicle, wherein landing of the vertical landing vehicle lands at the touchdown point using the landing profile.

Yet another example of the present disclosure provides a method for controlling landing of a vertical landing vehicle. A landing profile for landing the vertical landing vehicle is determined by a computer system using a third derivative of a position equation, an initial position, an initial speed, a final speed, and a touchdown point for the vertical landing vehicle. Landing of the vertical landing vehicle is controlled using the landing profile.

Still another example of the present disclosure provides a computer program product for controlling landing of a vertical landing vehicle. The computer program product comprises a computer-readable storage media with first program code and second program code stored on the computer-readable storage media. The first program code is executable by a computer system to cause the computer system to determine a landing profile for landing the vertical landing vehicle using a third derivative of a position equation, an initial position, an initial speed, a final speed, and a touchdown point for the vertical landing vehicle. The second first program code is executable by the computer system to cause the computer system to control landing of the vertical landing vehicle using the landing profile.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. The illustrative examples recognize and take into account that one solution involves using sensors to determine when a vertical take-off and landing vehicle has landed. For example, the illustrative examples recognize and take into account that a switch on a skid or landing gear of a vertical take-off and landing vehicle can be used to detect when the vertical take-off and landing vehicle has contacted the ground. As another example, the illustrative examples recognize and take into account that an altimeter or global positioning system receiver can also be used to determine when the vertical take-off and landing vehicle has contacted the ground.

The illustrative examples recognize and take into account that these and other types of sensors can be used to measure parameters such as distance from the ground, weight on wheels, the delta between a commanded movement and a detected movement, and other suitable parameters. The illustrative examples recognize and take into account that each of these parameters and other parameters can be detected using a number of different types of sensors.

The illustrative examples recognize and take into account that measuring parameters from different types of sensors provides independent sources of information to detect a landing of a vertical take-off and landing vehicle. The illustrative examples also recognize and take into account that one or more of these sources of information detected by a sensor system can be used in conjunction with a control process.

The illustrative examples recognize and take into account that the control process that implements a landing profile based on reducing jerk can be used in addition to or in place of information from the sensor system to determine when the vertical take-off and landing vehicle has landed.

In the illustrative example, jerk is felt by an object as a change in force. The jerk can be felt as an increasing or decreasing force on the object. The jerk is also known as a jolt, surge, or lurch and is a rate of change in acceleration. This rate of change in acceleration is a third derivative of a position equation.

Thus, a method, apparatus, system, and computer program product can control a landing of a vertical take-off and landing vehicle. In one illustrative example, the landing can be controlled to provide smooth motion for movement of the vertical take-off and landing vehicle to a touchdown point. The touchdown point is a location where the vertical take-off and landing vehicle is to land. In one illustrative example, the smooth motion can be provided using a minimum jerk profile. This profile can be developed through solving an optimal control problem in the illustrative example.

Figure 1:
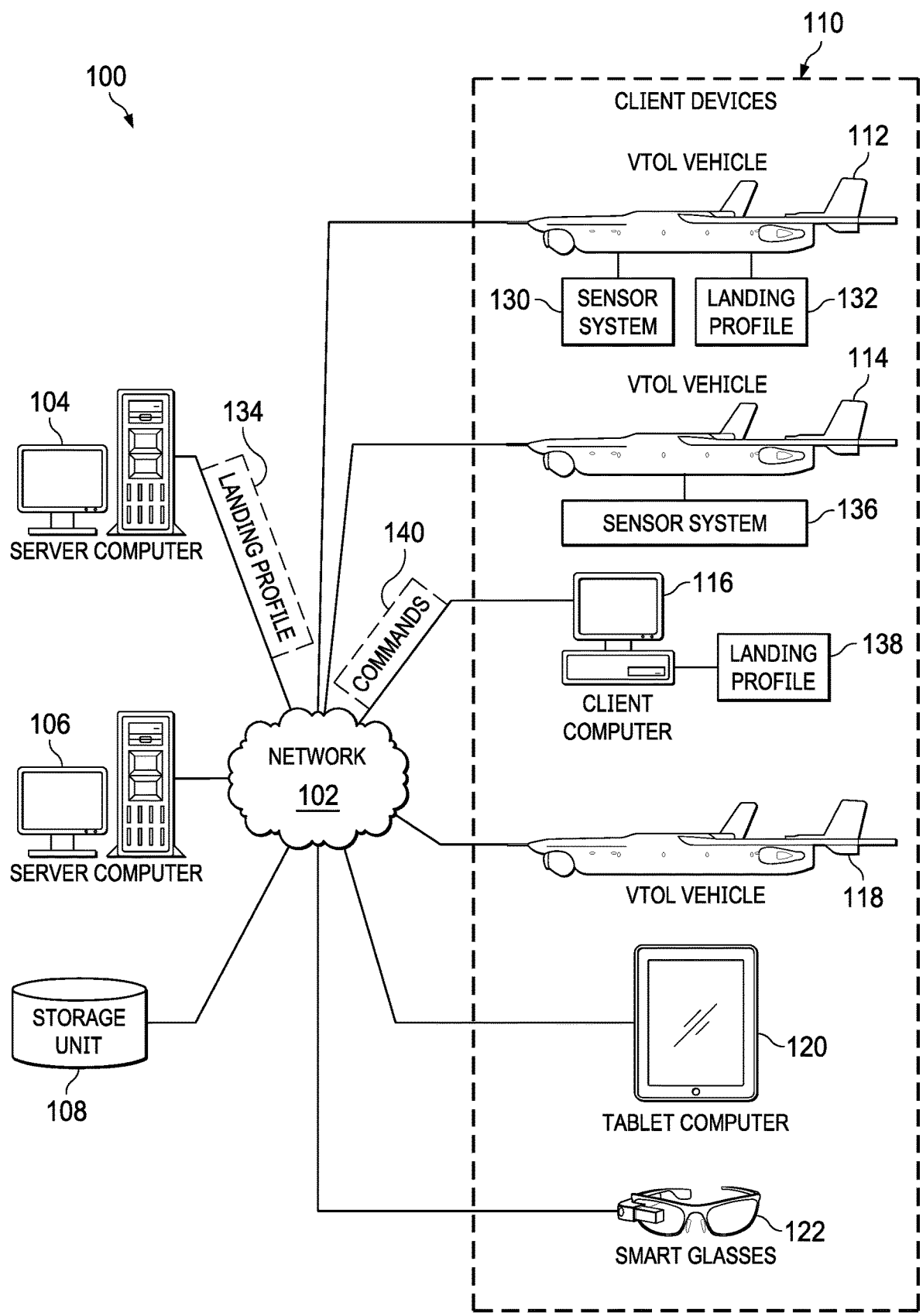
FIG. 1 is a pictorial representation of a network of data processing systems in which illustrative examples may be implemented.

With reference now to the figures and, in particular, with reference to FIG. 1, a pictorial representation of a network of data processing systems is depicted in which illustrative examples may be implemented. Network data processing system 100 is a network of computers in which the illustrative examples may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include vertical take-off and landing (VTOL) vehicle 112, vertical take-off and landing (VTOL) vehicle 114, client computer 116, and vertical take-off and landing (VTOL) vehicle 118. Client devices 110 can be, for example, vehicles, cars, vertical take-off and landing vehicles, aircraft, spacecraft, computers, workstations, or network computers. In the depicted example, server computer 104 provides information, such as boot files, operating system images, and applications to client devices 110. Further, client devices 110 can also include other types of client devices such as tablet computer 120 and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative examples.

In this illustrative example, vertical take-off and landing (VTOL) vehicle 112, vertical take-off and landing (VTOL) vehicle 114, and vertical take-off and landing (VTOL) vehicle 118 connect to network 102 using wireless communications links when moving or flying. Vertical take-off and landing (VTOL) vehicle 112, vertical take-off and landing (VTOL) vehicle 114, and vertical take-off and landing (VTOL) vehicle 118 can switch to using wired communications links to connect to network 102 after landing.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, vertical take-off and landing (VTOL) vehicle 112, vertical take-off and landing (VTOL) vehicle 114, and vertical take-off and landing (VTOL) vehicle 118 can take-off and land vertically. In one illustrative example, landing these vertical take-off and landing (VTOL) vehicles can be controlled in a manner that provides a desired landing even when at least one of turbulence or ground effects are encountered during landing.

For example, actions such as reducing power to the propulsion system, turning off the propulsion system, or other landing actions may be performed when vertical take-off and landing (VTOL) vehicle 112 has landed. Performing these actions after landing can reduce issues such as tilting, a hard landing, or drifting.

In this illustrative example, sensor system 130 in vertical take-off and landing (VTOL) vehicle 112 and landing profile 132 for vertical take-off and landing (VTOL) vehicle 112 can be used to determine when vertical take-off and landing (VTOL) vehicle 112 has landed. Sensor system 130 can generate a landing signal when sensor system 130 detects landing of vertical take-off and landing (VTOL) vehicle 112.

Additionally, vertical take-off and landing (VTOL) vehicle 112 reaching a touchdown position identified in a landing profile can also be an indication that vertical take-off and landing (VTOL) vehicle 112 has landed. Both sensor system 130 and landing profile 132 can be used as independent sources for determining when vertical take-off and landing (VTOL) vehicle 112 has landed.

As depicted, sensor system 130 can be, for example, a switch on a landing gear or an accelerometer for vertical take-off and landing (VTOL) vehicle 112. Landing profile 132 can be determined in a manner that reduces jerk when vertical take-off and landing (VTOL) vehicle 112 descends to a touchdown point.

In this illustrative example, landing profile 132 is a profile comprising a set of trajectories that can be followed to land vertical take-off and landing (VTOL) vehicle 112. For example, landing profile 132 can include a speed trajectory, an acceleration trajectory, or some other curve profile that can be used to operate vertical take-off and landing (VTOL) vehicle 112 to land at a touchdown point.

Landing profile 132 can be determined using a third derivative of the position equation that reduces the jerk when vertical take-off and landing (VTOL) vehicle 112 reaches the touchdown point. In this illustrative example, the touchdown point is the position where vertical take-off and landing (VTOL) vehicle 112 has landed on a surface.

In another illustrative example, vertical take-off and landing (VTOL) vehicle 114 does not calculate a landing profile. Instead, landing profile 134 for vertical take-off and landing (VTOL) vehicle 114 can be determined by server computer 104. Server computer 104 can send landing profile 134 to vertical take-off and landing (VTOL) vehicle 114 over network 102. In this example, vertical take-off and landing (VTOL) vehicle 114 has determined that vertical take-off and landing (VTOL) vehicle 114 has landed using both sensor system 136 and landing profile 134 received from server computer 104.

For example, vertical take-off and landing (VTOL) vehicle 114 can determine that it has landed when sensor system 136 generates a landing signal, and vertical take-off and landing (VTOL) vehicle 114 determines that it has reached the touchdown point in landing profile 134.

In another illustrative example, landing profile 138 for vertical take-off and landing (VTOL) vehicle 118 can be determined by client computer 116. In this illustrative example, client computer 116 can send commands 140 to control movement of vertical take-off and landing (VTOL) vehicle 118 to move to the touchdown point in landing profile 138.

In this depicted example, landing profile 138 is not sent to vertical take-off and landing (VTOL) vehicle 118. Instead, commands 140 are sent to vertical take-off and landing (VTOL) vehicle 118 to control movement of vertical take-off and landing (VTOL) vehicle 118. Further, in this depicted example, a sensor system may not be used to determine when vertical take-off and landing (VTOL) vehicle 118 has landed. Instead, the determination of when vertical take-off and landing (VTOL) vehicle 118 has landed can be made when vertical take-off and landing (VTOL) vehicle 118 reaches the touchdown point in landing profile 138.

In all three examples, the movement of the vertical take-off and landing (VTOL) vehicles is controlled using the landing profiles, directly or indirectly. Further, the use of sensor systems to generate a landing signal provides an additional independent source of determining when a vertical take-off and landing (VTOL) vehicle has landed in addition to using a landing profile. As a result, sensor systems can enable verification or increased accuracy in determining when a vertical take-off and landing (VTOL) vehicle has landed. In other words, with multiple sources for determining when vertical take-off and landing (VTOL) vehicles have landed, the confidence when landing has occurred increases.

Figure 2:
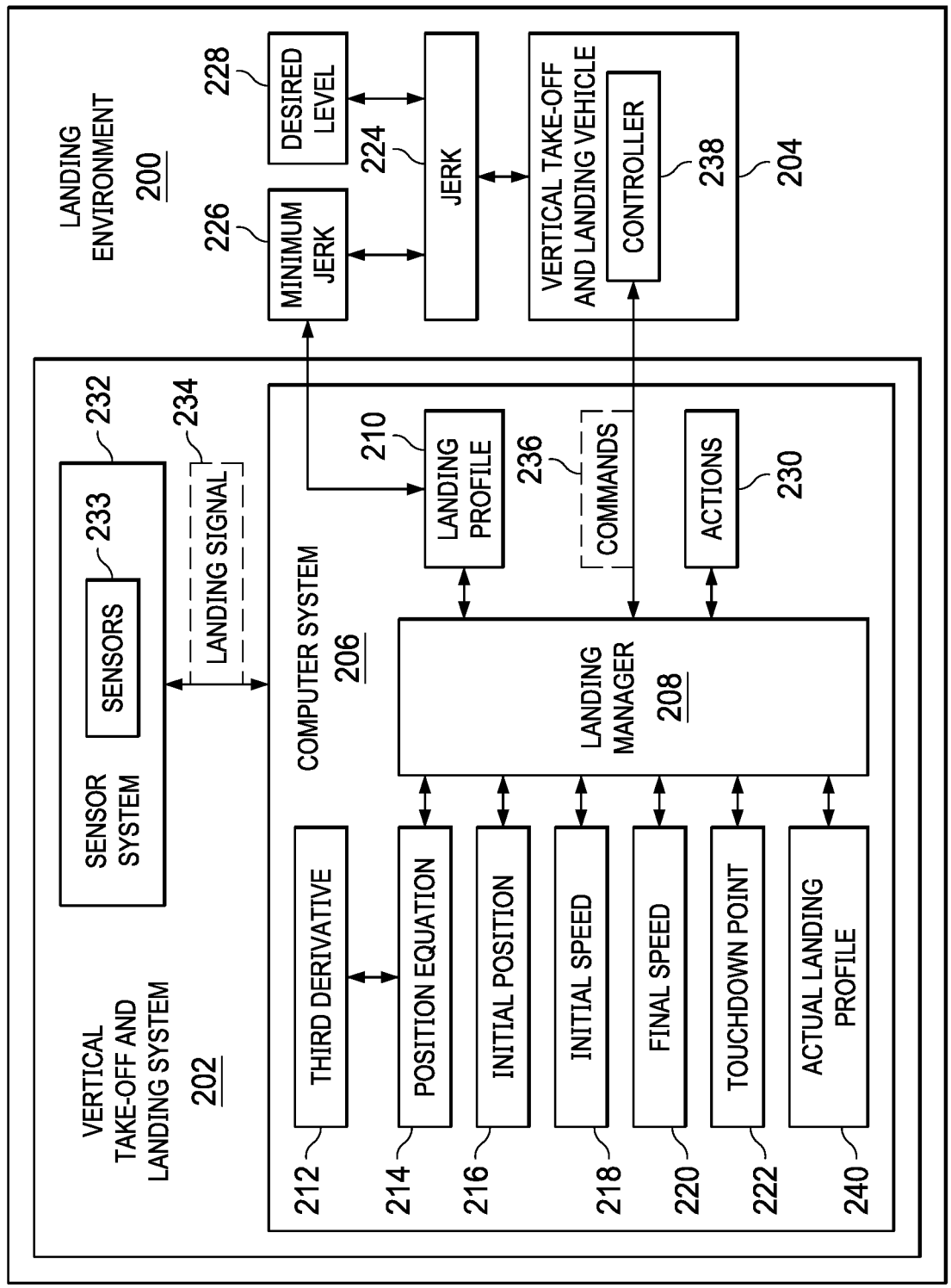
FIG. 2 is a block diagram of a landing environment in accordance with an illustrative example.

With reference now to FIG. 2, a block diagram of a landing environment is depicted in accordance with an illustrative example. In this illustrative example, landing environment 200 includes components that can be implemented in hardware such as the hardware shown in network data processing system 100 in FIG. 1.

In landing environment 200, vertical take-off and landing system 202 can operate to manage the landing of vertical take-off and landing vehicle 204. In this illustrative example, vertical take-off and landing vehicle 204 can take a number of different forms. For example, vertical take-off and landing vehicle 204 can be selected from one of a tiltrotor vehicle, a rotorcraft, a helicopter, a gyrodyne, a gyroplane, a tilt jet vertical take-off and landing aircraft, a direct-lift thrust vectoring aircraft, a tilt wing aircraft, and other aircraft that are capable of taking off and landing vertically.

Further, vertical take-off and landing vehicle 204 can be piloted, remotely piloted, or an autonomous aircraft. When piloted or remotely piloted, management of landing can be performed as part of an autopilot or other automatic landing system for vertical take-off and landing vehicle 204.

In this illustrative example, vertical take-off and landing system 202 includes a number of different components. As depicted, vertical take-off and landing system 202 comprises computer system 206 and landing manager 208. In this illustrative example, landing manager 208 is located in computer system 206.

Landing manager 208 can be implemented in software, hardware, firmware, or a combination thereof. When software is used, the operations performed by landing manager 208 can be implemented in program code configured to run on hardware, such as a processor unit. When firmware is used, the operations performed by landing manager 208 can be implemented in program code and data and stored in persistent memory to run on a processor unit. When hardware is employed, the hardware can include circuits that operate to perform the operations in landing manager 208.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

In this illustrative example, landing manager 208 in computer system 206 is configured to determine landing profile 210 for landing vertical take-off and landing vehicle 204 using third derivative 212 of position equation 214, initial position 216, initial speed 218, final speed 220, and touchdown point 222 for vertical take-off and landing vehicle 204. In this illustrative example, landing profile 210 can also be referred to as a descend profile. In this illustrative example, landing profile 210 can define position, speed, acceleration, and jerk over time.

In this example, landing profile 210 is determined in a manner that jerk 224 is reduced in landing vertical take-off and landing vehicle 204 at touchdown point 222. In this illustrative example, the reduction of jerk 224 can be, for example, reducing jerk 224 to at least one of minimum jerk 226 or desired level 228 of jerk 224.

In this illustrative example, position equation 214 is an equation that describes the position of vertical take-off and landing vehicle 204 over time. In this illustrative example, position equation 214 can be a fifth order equation. A fifth order equation is also known as a fifth degree polynomial. The fifth order equation can also be referred to as a quintic polynomial in this example. In this illustrative example, the position of vertical take-off and landing vehicle 204 is described in three dimensions. For example, the position of vertical take-off and landing vehicle 204 can be described using latitude, longitude, and altitude.

In this illustrative example, initial position 216 is the position of vertical take-off and landing vehicle 204 at the beginning of calculations to determine landing profile 210. Touchdown point 222 is the position of vertical take-off and landing vehicle 204 when vertical take-off and landing vehicle 204 reaches the final position, which is when vertical take-off and landing vehicle 204 has landed in this illustrative example.

Initial speed 218 can be the speed of vertical take-off and landing vehicle 204 at the time when landing profile 210 is determined. Final speed 220 is the speed of vertical take-off and landing vehicle 204 when touchdown point 222 is reached. In this illustrative example, speed is the magnitude in the change of the position of vertical take-off and landing vehicle 204. Speed is a scaler quantity. In some illustrative examples, a direction such as a negative or positive sign can be associated with speed to form a velocity for vertical take-off and landing vehicle 204. In other words, speed can be the magnitude component of velocity.

Landing manager 208 is configured to perform a set of actions 230 when landing signal 234 is received from sensor system 232 and when vertical take-off and landing vehicle 204 reaches touchdown point 222. In this illustrative example, the set of actions 230 can be selected from at least one of turning off a propulsion system for vertical take-off and landing vehicle 204, indicating that vertical take-off and landing vehicle 204 has landed, or some other suitable action.

As depicted, sensor system 232 can be a part of vertical take-off and landing system 202. Vertical take-off and landing system 202 operates as a high integrity touchdown detection system in which landing of vertical take-off and landing vehicle 204 can be detected with a desired level of confidence.

In this example, sensor system 232 is configured to detect a landing of vertical take-off and landing vehicle 204. In this illustrative example, sensor system 232 generates landing signal 234 when the landing of vertical take-off and landing vehicle 204 is detected by sensor system 232.

In this illustrative example, sensor system 232 is a hardware system and can include software. As depicted, sensor system 232 is comprised of a set of sensors 233. The set of sensors 233 can be selected from at least one of a switch on a skid or landing gear on vertical take-off and landing vehicle 204, an altitude sensor, an altimeter, a global positioning system receiver, an accelerometer, a camera system, an electromechanical sensing device, an ultrasonic sensor, a light detection and ranging system, or some other suitable type of sensor.

Further, sensor system 232 can be located inside of vertical take-off and landing vehicle 204, at a remote location, or a combination of the two. In this illustrative example, sensors 233 in sensor system 232 can include redundant sensors to increase the integrity or accuracy at which landing of vertical take-off and landing vehicle 204 can be detected.

For example, sensor system 232 includes a light detection and ranging system which can be located in a vertiport or other type of landing pattern location. Another portion of sensor system 232 can be an accelerometer located in the landing gear of vertical take-off and landing vehicle 204. In yet other illustrative examples, another accelerometer can be located on a landing pad in addition to or in place of using an accelerometer on the landing gear of vertical take-off and landing vehicle 204.

In this illustrative example, the detection of vertical take-off and landing vehicle 204 reaching touchdown point 222 can also be determined using a sensor. In this illustrative example, the sensor can be a different type of sensor from the sensor used in sensor system 232 to determine the landing of vertical take-off and landing vehicle 204. For example, reaching touchdown point 222 can be made using a global positioning system receiver while determining the landing of vertical take-off and landing vehicle 204 can be determined using an altitude sensor or a switch.

In this manner, independent or different sources of information can be used to increase the confidence in determining when vertical take-off and landing vehicle 204 has landed. In this example, landing signal 234 provides additional confirmation that vertical take-off and landing vehicle has landed in addition to determining that touchdown point 222 and landing profile 210 have been reached.

In addition to performing the set of actions 230 when vertical take-off and landing vehicle 204 has landed, landing manager 208 can also control operation of vertical take-off and landing vehicle 204 as part of the landing process. For example, landing manager 208 can control the landing of vertical take-off and landing vehicle 204 using landing profile 210.

In controlling the landing, landing manager 208 can send a set of commands 236 to controller 238 for vertical take-off and landing vehicle 204. As depicted, commands 236 can cause controller 238 to control vertical take-off and landing vehicle 204 to follow landing profile 210 to land vertical take-off and landing vehicle 204 at touchdown point 222. Controller 238 can be located in vertical take-off and landing vehicle 204. Controller 238 can be hardware, software, or combination of the two. Controller 238 can be, for example, an autopilot, an autonomous flight management system, or some other suitable component that controls the landing of vertical take-off and landing vehicle 204.

In this illustrative example, landing profile 210 can be compared to actual landing profile 240. This comparison can be used to make adjustments in the landing of vertical take-off and landing vehicle 204. For example, commands 236 can be sent to adjust the landing of vertical take-off and landing vehicle 204.

In one illustrative example, one or more technical solutions are present that overcome a technical problem with landing a vertical take-off and landing vehicle. As a result, one or more technical solutions can provide a technical effect of enabling landing of vertical take-off and landing vehicle 204 in a desired manner. In one illustrative example, one or more technical solutions are present that provide a technical effect of performing actions when vertical take-off and landing vehicle 204 has actually landed.

Computer system 206 can be configured to perform at least one of the steps, operations, or actions described in the different illustrative examples using software, hardware, firmware, or a combination thereof. As a result, computer system 206 operates as a special purpose computer system in which landing manager 208 in computer system 206 enables determining a landing profile that can be used to land vertical take-off and landing vehicle 204. Further, when receiving landing signal 234 from sensor system 232, a further confirmation or verification of the landing of vertical take-off and landing vehicle 204 can be determined by computer system 206 with landing manager 208. In particular, landing manager 208 transforms computer system 206 into a special purpose computer system as compared to currently available general computer systems that do not have landing manager 208.

Figure 3:
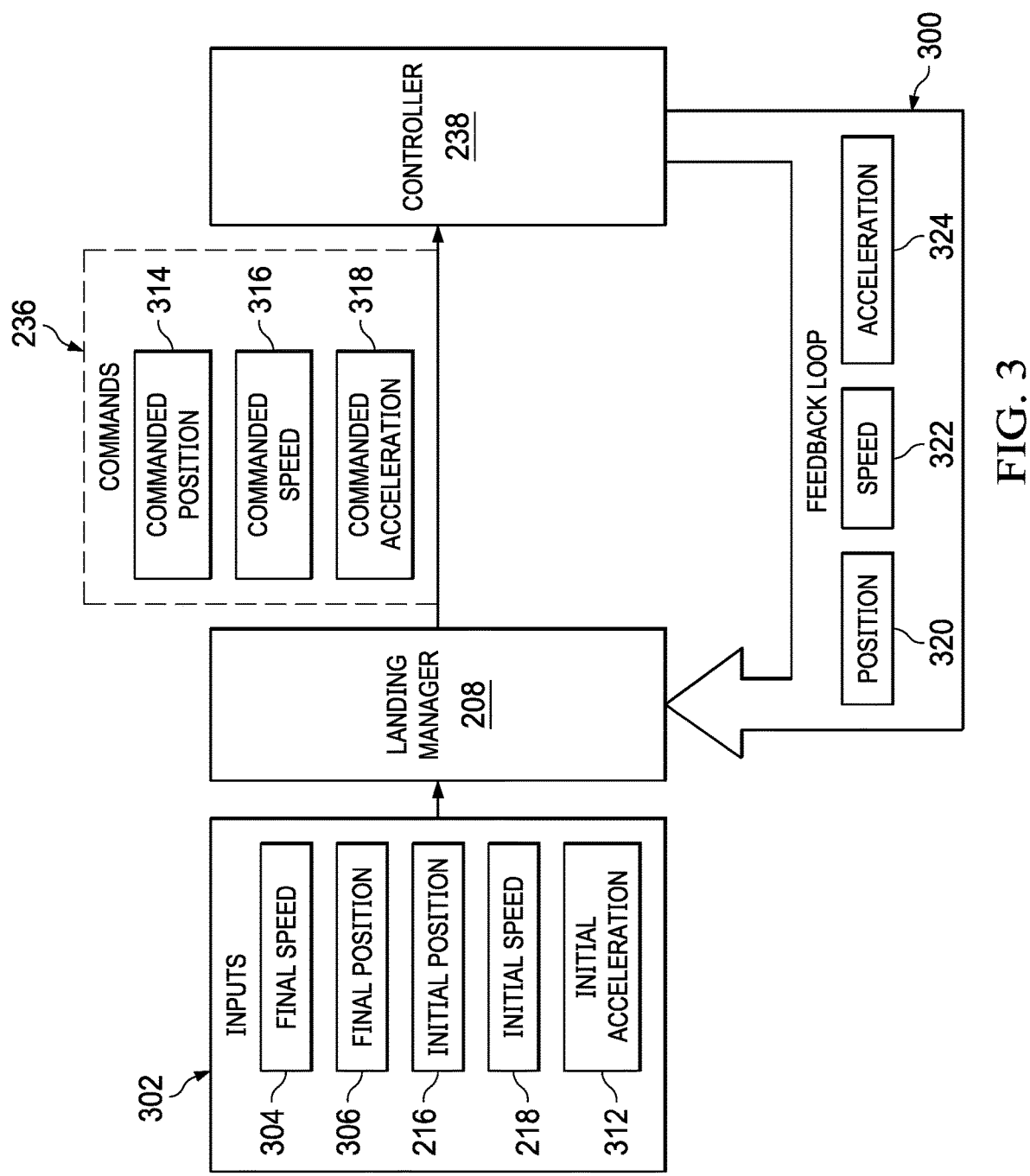
FIG. 3 is an illustration of a control system for controlling landing of an aircraft in accordance with an illustrative example.

Turning next to FIG. 3, an illustration of a control system for controlling landing of an aircraft is depicted in accordance with an illustrative example. In the illustrative examples, the same reference numeral may be used in more than one figure. This reuse of a reference numeral in different figures represents the same element in the different figures.

In this illustrative example, landing manager 208 and controller 238 form a control system with feedback loop 300. As depicted, inputs 302 include final speed 304 and final position 306. These inputs are the desired parameters for landing vertical take-off and landing vehicle 204 in FIG. 2. Inputs 302 also include initial position 216, initial speed 218, and initial acceleration 312 in this example. These inputs are measured at the beginning of the process performed by landing manager 208 to determine commands 236.

With these inputs, landing manager 208 can output commands 236. In this example, commands 236 are sent to controller 238. In this example, commands 236 can include commanded position 314, commanded speed 316, and commanded acceleration 318. Controller 238 can control vertical take-off and landing vehicle 204 using commands 236.

Further, controller 238 can measure position 320, speed 322, and acceleration 324 which form data in feedback loop 300. These parameters are used as initial position 216 and initial speed 218 in FIG. 2. In some illustrative examples, initial acceleration 312 may also be present. When initial acceleration 312 is present, acceleration 324 is also measured and returned in feedback loop 300.

Landing manager 208 can generate new commands for commands 236. The recalculated form of commands 236 are current commands that are sent to controller 238 for controlling the landing of vertical landing take-off and landing vehicle 204 in FIG. 2 using the current commands.

Figure 4:
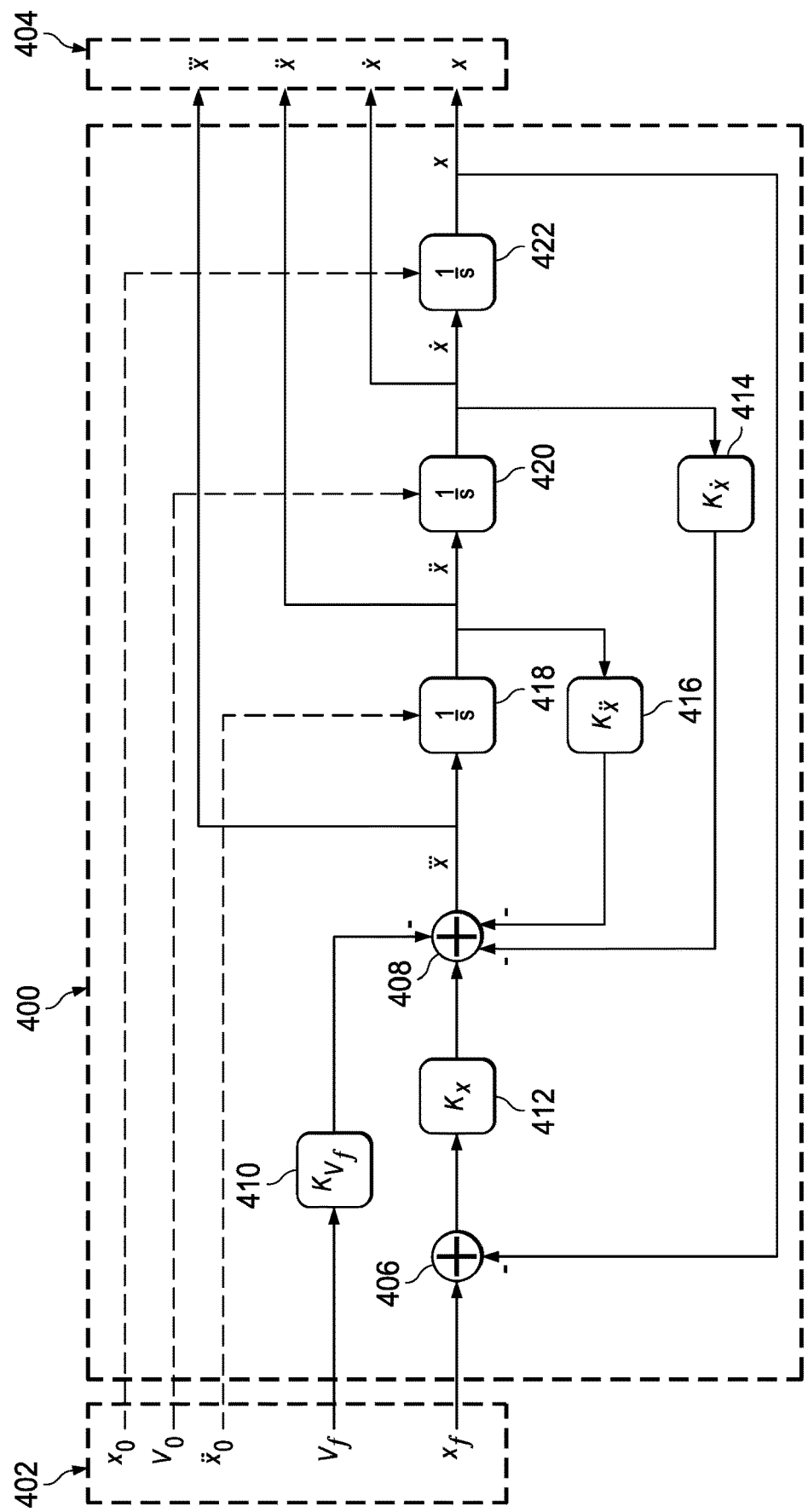
FIG. 4 is an illustration of a block diagram of a control model in accordance with an illustrative example.

Turning now FIG. 4, an illustration of a block diagram of a control model is depicted in accordance with an illustrative example. In this depicted example, control model 400 is an example of a model that can be used in landing manager 208 to generate at least one of landing profile 210 or commands 236 to control the landing of vertical take-off and landing vehicle 204 in FIG. 2.

As depicted, inputs 402 into control model 400 comprise $x_0$, $V_0$, $\ddot{x}_0$, $V_f$, and $x_f$. Outputs 404 from control model 400 comprise x, $\dot{x}$, $\ddot{x}$, and [|$]$`$$[|$]$`` Apẍ.

In this illustrative example, $x_f$ is the touchdown point, and $V_f$ is the final velocity. The velocity is speed with a sign indicating direction. These two parameters can be set as a desired touchdown point and landing speed for vertical take-off and landing vehicle 204 in FIG. 2. In this illustrative example, $x_0$ is the initial position, $V_0$ is the initial speed, and $\ddot{x}_0$ is the initial acceleration.

In this illustrative example, in outputs 404, x is position, $\dot{x}$ is the velocity, $\ddot{x}$ is acceleration, and $\dddot{x}$ is jerk. In this illustrative example, the values of these parameters can be commands used to control the landing of vertical take-off and landing vehicle 204 in FIG. 2.

As depicted, control model 400 comprises logic functions adder 406, adder 408, constant $K_{V_f}$ 410, constant $K_x$ 412, $K_x$ constant 414, and constant $K_{\dot{x}}$ 416. Control model 400 also includes constant 1/s 418, constant 1/s 420, and constant 1/s 422.

In this illustrative example, the output of adder 408 is $\dddot{x}$; the output of constant 1/s 418 is $\ddot{x}$; the output of constant 1/s 420 is $\dot{x}$, and the output of constant 422 is x.

In this illustrative example, the initial conditions in inputs 402 can be updated periodically, in response to events, or continuously in real-time. In this manner, these conditions can be used as feedback for updating commands 404 as vertical take-off and landing vehicle 204 in FIG. 2 moves towards landing on touchdown point 222 in FIG. 2. Updates to the initial conditions resulting in updates being made to the constants K gains is a function of the time remaining until touchdown for vertical takeoff and landing vehicle 204.

The illustrations of the different components in landing environment 200 in FIGS. 2-4 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, computer system 206 with landing manager 208 can be located in vertical take-off and landing vehicle 204 or at any remote location in communication with vertical take-off and landing vehicle 204. When computer system 206 is at a location remote to vertical take-off and landing vehicle 204, vertical take-off and landing vehicle 204 includes one or more data processing systems. The data processing systems can include a computer system, a controller, or other suitable components that can be used to autonomously control the landing of vertical take-off and landing vehicle 204.

As another example, sensor system 232 can be a separate component located outside of vertical take-off and landing system 202. In yet another illustrative example, landing manager 208 can determine and perform actions for one or more vertical take-off and landing vehicles in addition to or in place of vertical take-off and landing vehicle 204.

Figure 5:
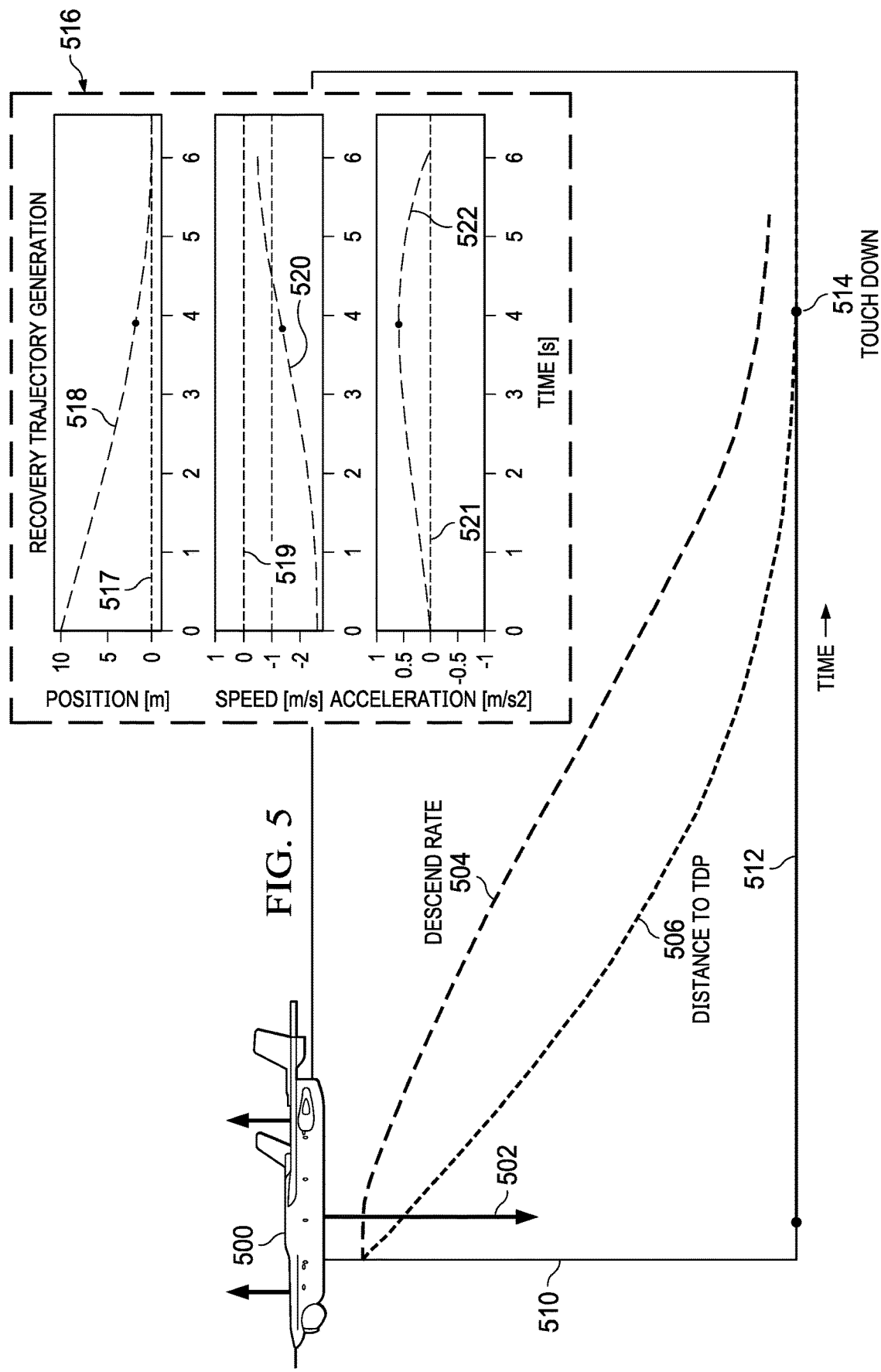
FIG. 5 is an illustration of trajectories in a landing profile for a vertical take-off and landing vehicle in accordance with an illustrative example.

With reference next to FIG. 5, an illustration of trajectories in a landing profile for a vertical take-off and landing vehicle is depicted in accordance with an illustrative example. In this illustrative example, vertical take-off and landing vehicle 500 is an example of an implementation for vertical take-off and landing vehicle 204 shown in block form in FIG. 2.

As depicted, vertical take-off and landing vehicle 500 moves in the direction of arrow 502 during landing. In this illustrative example, path and velocity control occur simultaneously during an approach to a touchdown point for vertical take-off and landing vehicle 500. In this illustrative example, Descend Rate curve 504 represents the velocity, and Distance to TDP curve 506 represents the path in this illustrative example. The path can also be referred to as the position of vertical take-off and landing vehicle 500 over time. These values for velocity and position are relative to y-axis 510 and time on x-axis 512. These curves are shown relative to the time needed to reach a touchdown point at time of touchdown 514.

In this illustrative example, the control of the velocity and the path of take-off and landing vehicle 500 can be controlled using landing profile 516. In this illustrative example, landing profile 516 comprises three trajectories. As depicted, landing profile 516 includes position trajectory 518, speed trajectory 520, and acceleration trajectory 522.

As shown, line 517 represents a position of zero for position trajectory 518. In this example, the position of zero means that vertical take-off and landing vehicle 500 has landed on the touchdown point. Line 519 is a speed of zero for speed trajectory 520, and line 521 is an acceleration of zero for acceleration trajectory 522. In some cases, acceleration trajectory 522 can be omitted in controlling landing of vertical take-off and landing vehicle 500.

Landing profile 516 can be generated in a manner that minimizes jerk during the descend and deceleration phase prior to touchdown of landing vertical take-off and landing vehicle 500. The jerk is a third derivative of a position vector with respect to time.

A landing profile, such as landing profile 516, provides the trajectory, velocity, and associated force or torque required to achieve the trajectory. In case of maneuvering a vertical take-off and landing vehicle, such as vertical take-off and landing vehicle 500, this landing profile can be used by controller 238 in FIG. 2 to provide an estimate of the required tilt angles to decelerate into a hover condition, given an initialization point and desired touchdown point.

The trajectories in the landing profile can be optimized for time or energy, with consideration of system limitations. Examples of trajectory generation can include minimization of maximum values of a state and control input, or the minimization of input energy into the system. One approach in Optimal Control Theory is to formulate a cost-function J(z), which captures the desired aspect of the system to be minimized. For example, the cost-function J(z) can be minimized:

$$J(z) = \max_{t \in [t_0, t_f]} |z|$$

which would minimize the maximum magnitude of z, where z is the parameter to be minimized.

Alternatively, the overall input energy can be minimized by minimizing:

$$J(z) = \int_{t_0}^{t_f} z^2 d\tau$$

where z is a function of the control signals, $t_f$ is the time when the touchdown point is reached, and $t_0$ is initial time.

The derivative of thrust is related to limitations of system actuation. As a result, z can be selected to represent jerk, which is the derivative of acceleration. A minimum jerk profile is desirable for smooth motion. By formulating this as an optimal control problem, the minimum jerk trajectory can be governed by a fifth order polynomial as follows:

$$x(t) = \sum_{n=0}^{5} a_n (t-t_0)^n$$

where n is the order, t is time, $t_0$ is initial time, and $a_n$ is a constant.

Given this fifth order polynomial model, the desired position x(t), velocity ẋ(t), acceleration ẍ(t), and jerk $\dddot{x}$(t) are as follows:

$$x(t) = a_0 + a_1\Delta_t + a_2\Delta_t^2 + a_3\Delta_t^3 + a_4\Delta_t^4 a_5\Delta_t^5 \quad (1)$$

$$\dot{x}(t) = a_1 + 2a_2\Delta_t + 3a_3\Delta_t^2 + 4a_4\Delta_t^3 + 5a_5\Delta_t^4 \quad (2)$$

$$\ddot{x}(t) = 2a_2 + 6a_3\Delta_t + 12a_4\Delta_t^2 + 20a_5\Delta_t^3 \quad (3)$$

$$\dddot{x}(t) = 6a_3 + 24a_4\Delta_t + 60a_5\Delta_t^2 \quad (4)$$

where $\Delta_t \triangleq t - t_0$ is the time span since the initial condition and where t is time, $t_0$ is initial time, $a_0$ is initial position, $a_1$ is initial velocity, $a_2$ is initial acceleration. In this example, $a_3$, $a_4$, and $a_5$ can be determined from final conditions and can be related to a combination of initial and final states and the duration of the path to touchdown.

In order to formulate the desired landing profile, the initial and desired final conditions are considered. With respect to initial conditions, a landing phase can start at $t=t_0[s]$ with an established descend-rate at:

$V_0=-500$[fpm] at an altitude of $x_0=10$[m] AGL, and our desired end condition is $x_f=0$, where $V_0$ is the initial velocity, $x_0$ his initial position, $x_f$ is the final position such as the touchdown point, and AGL is above ground level.

$V_f=-200$[fpm], and in this example, this landing phase is desired to be completed in $\Delta_f=t_f-t_0=6$[s]. In this case, these conditions determine parameters as follows:

$a_0 = x(t_0) \triangleq x_0$, sets the initial position at $x_0$[m] AGL;
$a_1 = \dot{x}(t_0) \triangleq V_0$, descend rate at start of final descend; and
$2a_2 = \ddot{x}(t_0) \triangleq A_0$, acceleration at the start of final descend.

The last three parameters, $a_3$, $a_4$, and $a_5$, can be defined by the desired conditions at touchdown. For example, $a_3$, $a_4$, and $a_5$ can be initial jerk, initial snap, and initial crackle, respectively.

Final conditions can be defined for landing at the touchdown point. In this illustrative example, at touchdown, $t=t_f$, the following final conditions can be selected as follows:

$x(t_f) \triangleq x_f=0$, defines the TDP position at 0 at ground level (AGL);
$\dot{x}(t_f) \triangleq V_f=-200$[fpm], sets 200 fpm descend rate at the touchdown point (TDP) and
$\ddot{x}(t_f)=0$, specifies no further deceleration while at TDP.

These final conditions can be used to solve for the remaining parameters, $a_3$, $a_4$, and $a_5$, found in Equations (1)-(4). The remaining parameters can be determined by substituting the specified conditions in Equations (1)-(4). The desired conditions at touchdown are as follows:

$$x(t_f) = x_f = x_0 + V_0\Delta_f + \frac{\ddot{x}_0}{2}\Delta_f^2 + a_3\Delta_f^3 + a_4\Delta_f^4 + a_5\Delta_f^5$$

$$\dot{x}(t_f) = V_f = V_0 + \ddot{x}_0\Delta_f + 3a_3\Delta_f^2 + 4a_4\Delta_f^3 + 5a_5\Delta_f^4$$

$$\ddot{x}(t_f) = 0 = A_0 + 6a_3\Delta_f + 12a_4\Delta_f^2 + 20a_5\Delta_f^3$$

where $\Delta_f \triangleq (t_f - t_0)$ is the duration of the trajectory to the touchdown point.

These expressions can be rearranged to determine the parameters as function of the desired behavior for the landing, as follows:

$$\begin{pmatrix} a_3 \\ a_4 \\ a_5 \end{pmatrix} = M^{-1}(\Delta_f) \begin{pmatrix} -x_0 - V_0\Delta_f - \frac{1}{2}A_0\Delta_f^2 \\ V_f - V_0 - A_0\Delta_f \\ -A_0 \end{pmatrix} \quad (5)$$

where $$M(\Delta_f) = \begin{pmatrix} \Delta_f^3 & \Delta_f^4 & \Delta_f^5 \\ 3\Delta_f^2 & 4\Delta_f^3 & 5\Delta_f^4 \\ 6\Delta_f & 12\Delta_f^2 & 20\Delta_f^3 \end{pmatrix}$$

The determination of $a_0$ through $a_6$ can be made using these equations. In this depicted example, with these parameters, desired trajectory for velocity and deceleration to the touchdown point can be determined.

In this depicted example, position trajectory 518, speed trajectory 520, and acceleration trajectory 522 for landing profile 516 can be interpreted as 'open loop' feedforward signals. Feedback tracking errors can be detected and modifications to landing profile 516 can be made. These modifications can be made by iteratively resetting the initial conditions and determining landing profile 516 towards the same final conditions.

Considering a general point in time $t=t_0$, the jerk required at that time to get to the desired final condition is as follows:

$$x^{(3)}(t_0) = 6a_3$$

The inverse of M in Equation 5 is:

$$M^{-1} = \begin{pmatrix} \frac{10}{\Delta_f^3} & -\frac{4}{\Delta_f^2} & \frac{1}{2\Delta_f} \\ -\frac{15}{\Delta_f^4} & \frac{7}{\Delta_f^3} & -\frac{1}{\Delta_f^2} \\ \frac{6}{\Delta_f^5} & -\frac{3}{\Delta_f^4} & \frac{1}{2\Delta_f^3} \end{pmatrix}$$

thus, the value of $a_3$ is obtained as:

$$a_3 = \frac{10}{\Delta_f^3}(x_f - x_0) - \frac{4}{\Delta_f^2}V_f - \frac{6}{\Delta_f^2}V_0 - \frac{3}{2\Delta_f}\ddot{x}_0$$

The desired expression for the jerk at $t_0$ is as follows:

$$x_c^{(3)}(t_0) = \frac{60}{\Delta_f^3}(x_f - x_0) - \frac{24}{\Delta_f^2}V_f - \frac{36}{\Delta_f^2}V_0 - \frac{9}{\Delta_f}\ddot{x}_0 \quad (6)$$

This is now expressed in terms of the current speed, acceleration, and distance remaining. Expression (6) can be used in a model following setup to provide a guidance law to hover recovery. Expression (6) can be rewritten as follows:

$$\frac{dX}{dt} = \begin{pmatrix} 0 & 1 & 0 \\ 0 & 0 & 1 \\ -K_x & -K_{\dot{x}} & -K_{\ddot{x}} \end{pmatrix} X + \begin{pmatrix} 0 \\ 0 \\ K_x \end{pmatrix} x_f + \begin{pmatrix} 0 \\ 0 \\ -K_{V_f} \end{pmatrix} V_f$$

where each gain $K = K(\Delta_f)$ and $X \triangleq (x\ \dot{x}\ \ddot{x})^T$, and $$K_x = \frac{60}{\Delta_f^3}, K_{\dot{x}} = \frac{36}{\Delta_f^2}, K_{\ddot{x}} = \frac{9}{\Delta_f}, K_{V_f} = \frac{24}{\Delta_f^2} \qquad (7)$$

These gains can be used for $K_{V_f}$ 410, $K_x$ 412, $K_{\dot{x}}$ 414, and $K_{\ddot{x}}$ 416 in control model 400 in FIG. 4.

To prevent the singularity in Equation (7) and keep finite gain values, the time-remaining can be lower bounded $\Delta_f \geq \in$, where $\in > 0$ can be determined ad-hoc or analytically from signal noise levels.

In the illustrative example, the landing profile can be constrained by limits other than initial and final conditions as described above. For example, staying above a maximum descend rate or a limit on maximum deceleration may be desired in some cases. These goals can be achieved in generating a landing profile by, for example, implicitly limiting the minimum time span and by explicitly computing the minimal possible time span associated with the limits. The implicit method is inherent to a real-time implementation. The explicit method is based on analytically determining the minimum possible time-span that meets the stated requirements.

If flexibility is present to pick the final time, such as if $\Delta_f$ may be varied, when vertical take-off and landing vehicle reaches the touchdown point, additional constraints can be considered. For example, for a vertical take-off and landing approach, maximum descend rate and deceleration can be limited by a vortex-ring state in which an undesired loss in lift can occur.

Limiting descend rate and deceleration can be achieved through the selection of $\Delta_f$. For example, with specifying a descend rate limit $R_{max}$ and a deceleration limit $D_{max}$, the optimal control problem statement can be formulated as minimizing the jerk but with the added constraint of a maximum descend rate and deceleration limited as follows:

$$\min_{\Delta_t \in [0, t_f - t_0]} \dot{x}(t) \geq -R_{max}$$

$$\min_{\Delta_t \in [0, t_f - t_0]} \ddot{x}(t) \geq -D_{max}$$

Equations (1)-(4) then provide a lower limit on what $\Delta_f$ can be achieved.

For example, when deceleration is constrained, the minimum possible time span $\Delta_f$ that keeps the vehicle within a deceleration constraint can be determined. Parameters $a_0$-$a_6$ can be determined from the initial conditions and the final state. These parameters can be expressed in terms of $\Delta_f$.

The maximum deceleration occurs at the point-in-time where $\dddot{x}(t) = 0$, that is, find $\Delta^*_t = (t^* - t_0)$ for which:

$$x(t^*) = 6a_3 + 24a_4 \Delta^*_t + 60 a_5 \Delta_t^{*2} = 0$$

The value for $\Delta^*_t$ is substituted into the expression for $\ddot{x}(t)$ to determine the maximum deceleration as function of $\Delta_f$:

$$\ddot{x}(t^*) \triangleq -D^*(\Delta_f)$$

$\Delta_f$ is selected to be large enough such that the maximum deceleration or minimum acceleration remains within the limit $D_{max}$, that is:

$$D^*(\Delta_f) \Rightarrow D_{max} \Rightarrow \Delta_f$$

When the descend rate is constrained, a minimum descend rate can be set by selecting a minimum time-span. This minimum descent rate can be achieved by obtaining parameters $a_0$-$a_6$ from the initial conditions and the required final state, as indicated above. These will be expressed in terms of $\Delta_f$.

In this illustrative example, the maximum descend rate occurs at the point-in-time where $\dddot{x}(t) = 0$, that is, find $\Delta_t^\dagger = (t^\dagger - t_0)$ for which:

$$x(t^\dagger) = 2a_2 + 6a_3 \Delta_t^\dagger + 12 a_4 \Delta_t^{\dagger 2} + 20 a_5 \Delta_t^{\dagger 3} = 0$$

The value for $\Delta_t^\dagger$ is substituted in the expression for $\dot{x}(t)$ to determine the maximum descend rate as function of $\Delta_f$:

$$\ddot{x}(t^\dagger) \triangleq -R^\dagger(\Delta_f)$$

$\Delta_f$ is selected to be large enough such that the maximum descend rate remains less than the lower limit $R_{max}$, that is:

$$R^\dagger(\Delta_f) < R_{max} \Rightarrow \Delta_f$$

Figure 6:
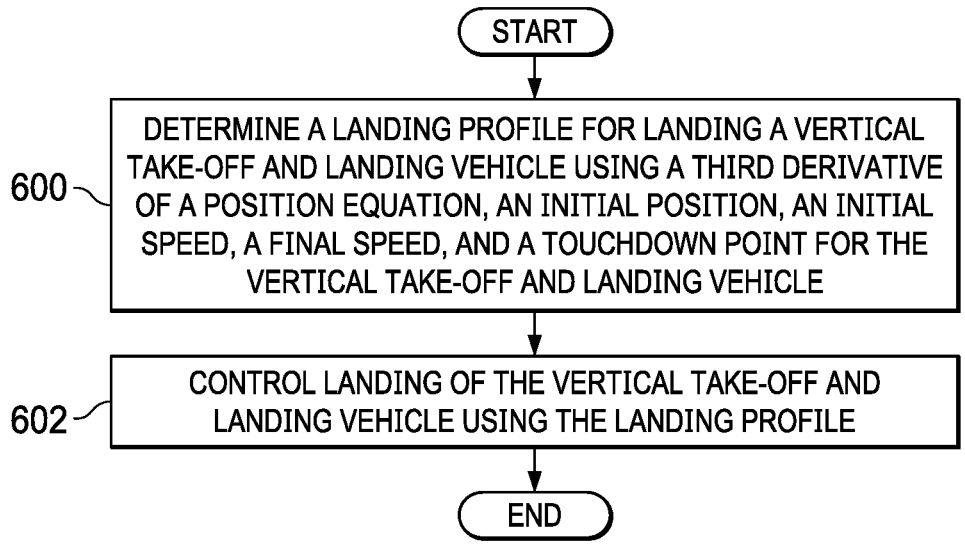
FIG. 6 is an illustration of a flowchart of a process for controlling landing of a vertical take-off and landing vehicle in accordance with an illustrative example.

Turning next to FIG. 6, an illustration of a flowchart of a process for controlling landing of a vertical take-off and landing vehicle is depicted in accordance with an illustrative example. The process in FIG. 6 can be implemented in hardware, software, or both. When implemented in software, the process can take the form of program code that is run by one or more processor units located in one or more hardware devices in one or more computer systems. For example, the process can be implemented in landing manager 208 in computer system 206 in FIG. 2. In the illustrative example, landing manager 208 can be located in the vertical take-off and landing vehicle or can be in another location on a computer system in a remote location that is in communication with the vertical take-off and landing vehicle.

The process begins by determining a landing profile for landing a vertical take-off and landing vehicle using a third derivative of a position equation, an initial position, an initial speed, a final speed, and a touchdown point for the vertical take-off and landing vehicle (operation 600). The process controls landing of the vertical take-off and landing vehicle using the landing profile (operation 602). The process terminates thereafter.

Figure 7:
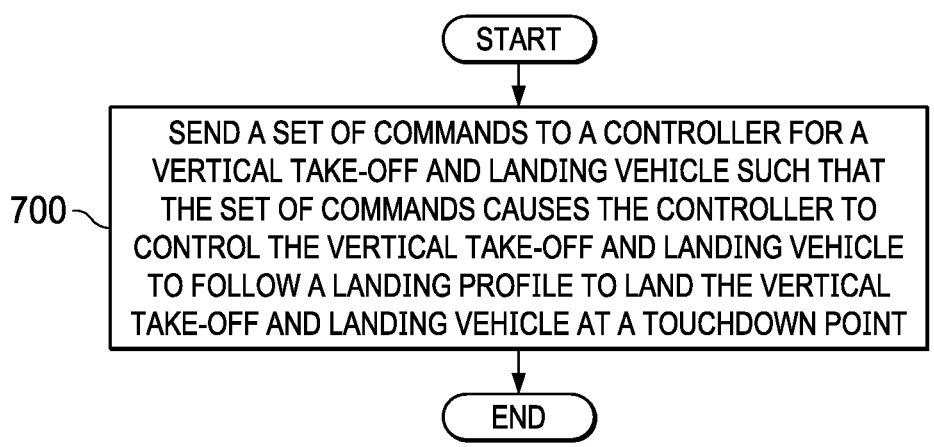
FIG. 7 is another illustration of a flowchart of a process for controlling landing of a vertical take-off and landing vehicle in accordance with an illustrative example.

With reference to FIG. 7, another illustration of a flowchart of a process for controlling landing of a vertical take-off and landing vehicle is depicted in accordance with an illustrative example. The process in FIG. 7 is an example of one implementation for operation 602 in FIG. 6.

The process sends a set of commands to a controller for a vertical take-off and landing vehicle such that the set of commands causes the controller to control the vertical take-off and landing vehicle to follow the landing profile to land the vertical take-off and landing vehicle at a touchdown point (operation 700). The process terminates thereafter.

Figure 8:
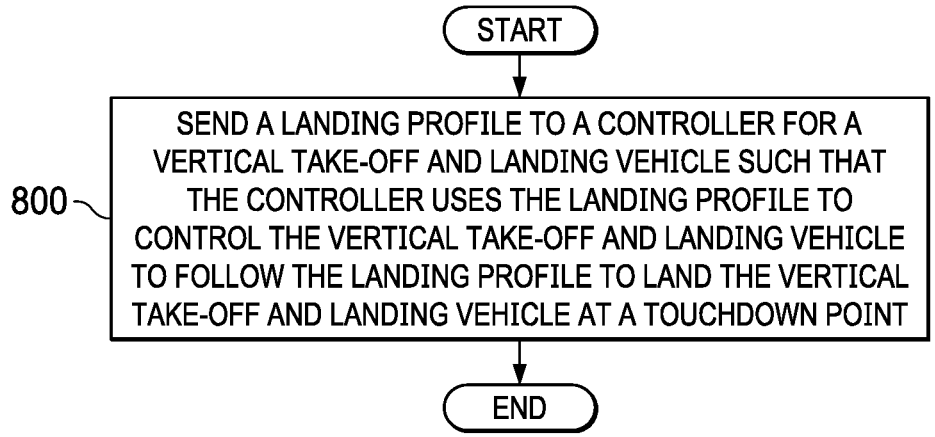
FIG. 8 is yet another illustration of a flowchart of a process for controlling landing of a vertical take-off and landing vehicle in accordance with an illustrative example.

In FIG. 8, yet another illustration of a flowchart of a process for controlling landing of a vertical take-off and landing vehicle is depicted in accordance with an illustrative example. The process in FIG. 8 is an example of one implementation for operation 602 in FIG. 6.

The process sends a landing profile to a controller for a vertical take-off and landing vehicle such that the controller uses the landing profile to control the vertical take-off and landing vehicle to follow the landing profile to land the vertical take-off and landing vehicle at a touchdown point (operation 800). The process terminates thereafter.

Figure 9:
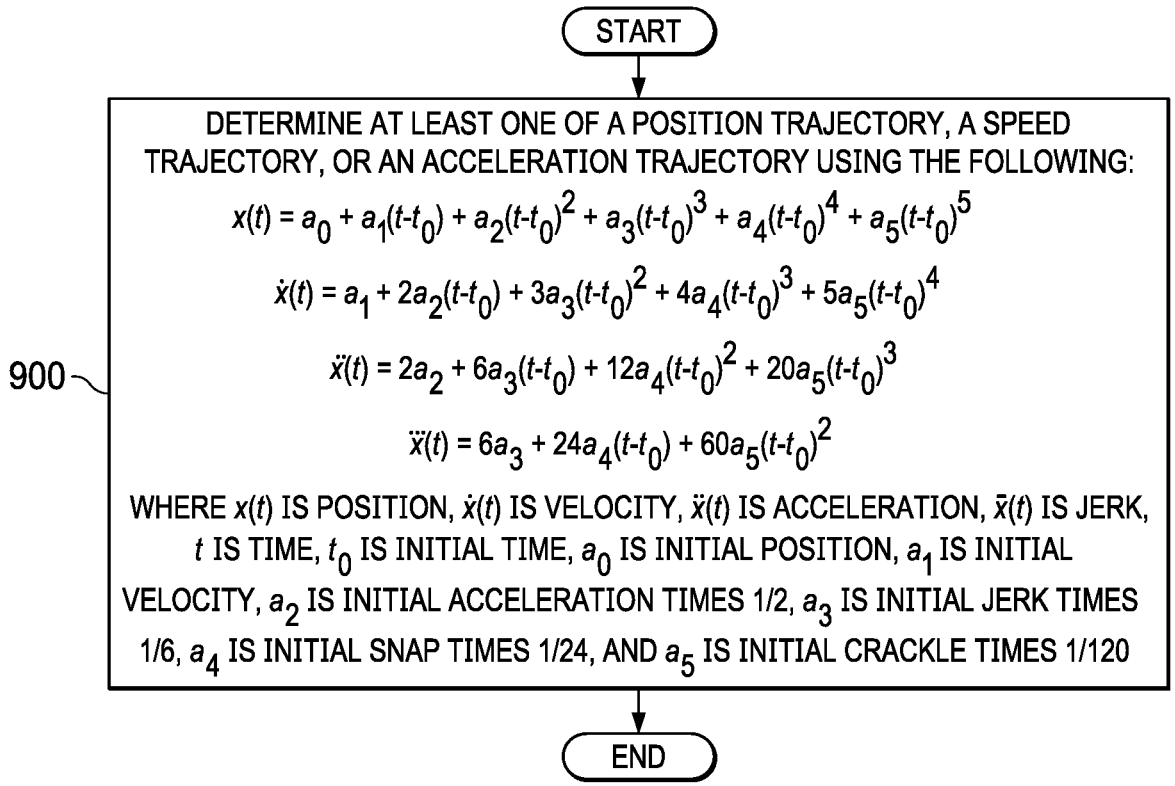
FIG. 9 is an illustration of a process for determining a landing profile in accordance with an illustrative example.

Turning now to FIG. 9, an illustration process for determining a landing profile is depicted in accordance with an illustrative example. This process is an example of one implementation for operation 600 in FIG. 6.

The process determines at least one of a position trajectory, a speed trajectory, or an acceleration trajectory using the following:

$$x(t)=a_0+a_1(t-t_0)+a_2(t-t_0)^2+a_3(t-t_0)^3+a_4(t-t_0)^4+a_5(t-t_0)^5$$

$$\dot{x}(t)=a_1+2a_2(t-t_0)+3a_3(t-t_0)^2+4a_4(t-t_0)^3+5a_5(t-t_0)^4$$

$$\ddot{x}(t)=2a_2+6a_3(t-t_0)+12a_4(t-t_0)^2+20a_5(t-t_0)^3$$

$$\dddot{x}(t)=6a_3+24a_4(t-t_0)+60a_5(t-t_0)^2$$

where $x(t)$ is position, $\dot{x}(t)$ is velocity, $\ddot{x}(t)$ is acceleration, $\dddot{x}(t)$ is jerk, t is time, $t_0$ is initial time, $a_0$ is initial position, $a_1$ is initial velocity, $a_2$ is initial acceleration times $\frac{1}{2}$, $a_3$ is initial jerk times $\frac{1}{6}$, $a_4$ is initial snap times $\frac{1}{24}$, and $a_5$ is initial crackle times $\frac{1}{120}$ (operation 900). The process terminates thereafter.

Figure 10:
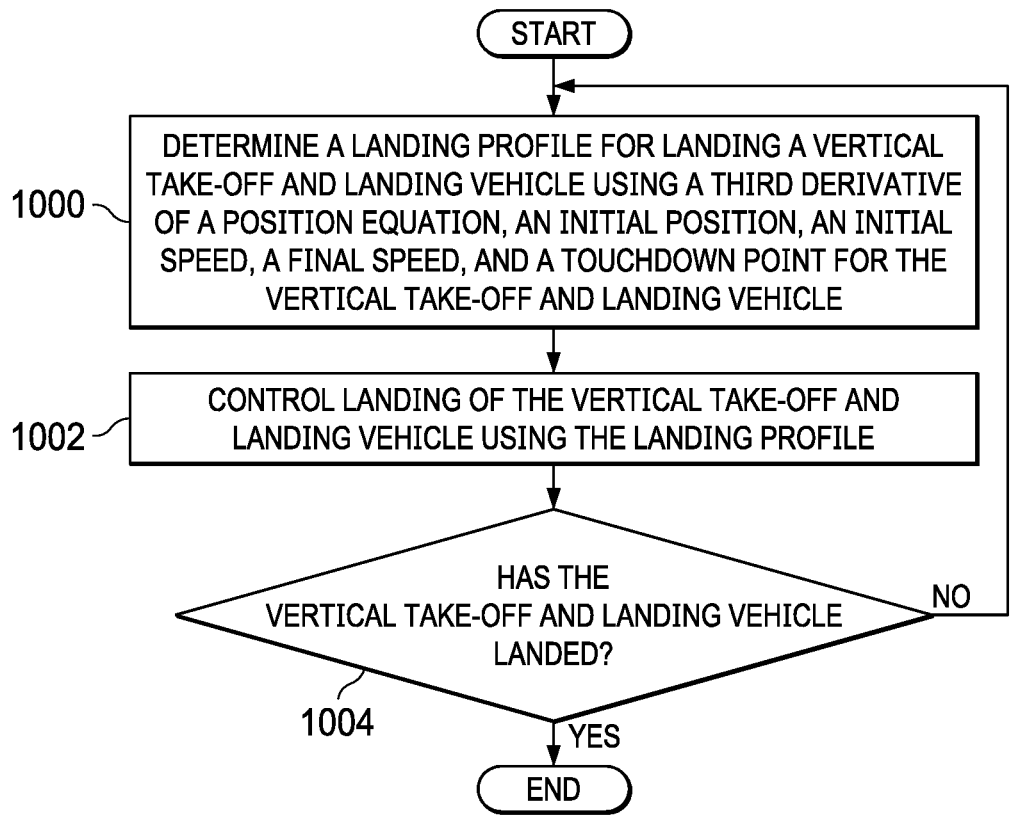
FIG. 10 is an illustration of a process for controlling landing of a vertical take-off and landing vehicle in accordance with an illustrative example.

With reference to FIG. 10, an illustration of a process for controlling landing of a vertical take-off and landing vehicle is depicted in accordance with an illustrative example. The process in FIG. 10 can be implemented in hardware, software, or both. When implemented in software, the process can take the form of program code that is run by one or more processor units located in one or more hardware devices in one or more computer systems. For example, the process can be implemented in landing manager 208 computer system 206 in FIG. 2. In the illustrative example, landing manager 208 can be located in the vertical take-off and landing vehicle or can be in another location in a computer system at a remote location that is in communication with a vertical take-off and landing vehicle.

The process begins by determining a landing profile for landing a vertical take-off and landing vehicle using a third derivative of a position equation, an initial position, an initial speed, a final speed, and a touchdown point for the vertical take-off and landing vehicle (operation 1000). The process controls landing of the vertical take-off and landing vehicle using the landing profile (operation 1002).

A determination is made as to whether the vertical take-off and landing vehicle has landed (operation 1004). If the vertical take-off and landing vehicle has not landed, the process returns to operation 1000). Otherwise, the process terminates thereafter. In this manner, the process can repeatedly determine the landing profile for landing the vertical take-off and landing vehicle using the third derivative of the position equation, the initial position, the initial speed, the final speed, and the touchdown point for the vertical take-off and landing vehicle. The initial position is a current position of the vertical take-off and landing vehicle, and the initial speed is a current speed of the vertical take-off and landing vehicle.

Figure 11:
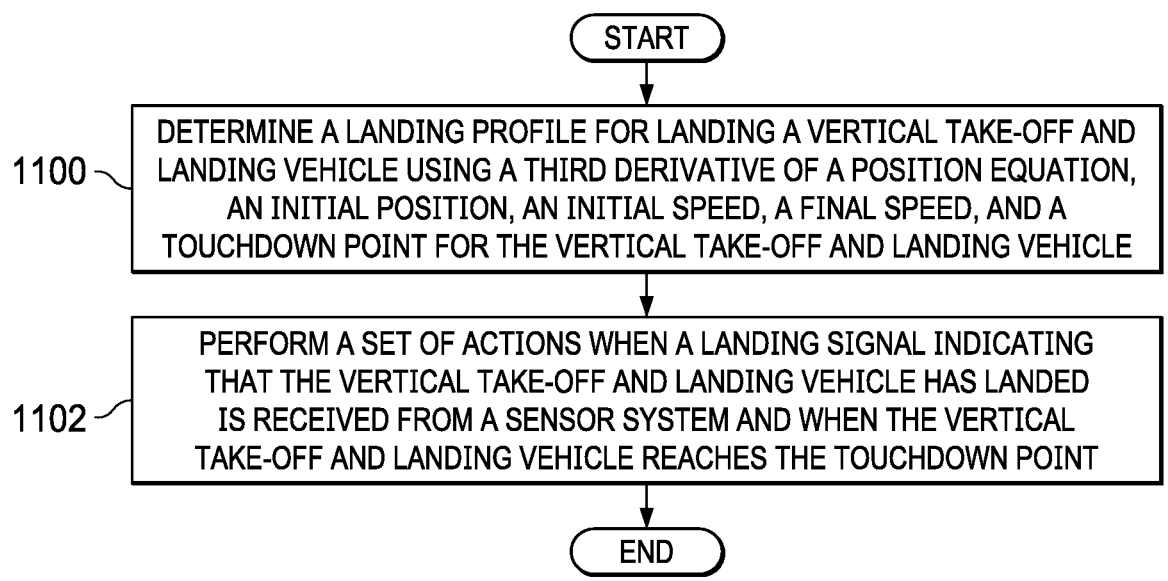
FIG. 11 is an illustration of a flowchart of a process for controlling landing of a vertical take-off and landing vehicle in accordance with an illustrative example.

Turning next to FIG. 11, an illustration of a flowchart of a process for controlling landing of a vertical take-off and landing vehicle is depicted in accordance with an illustrative example. The process in FIG. 6 can be implemented in hardware, software, or both. When implemented in software, the process can take the form of program code that is run by one or more processor units located in one or more hardware devices in one or more computer systems. For example, the process can be implemented in landing manager 208 in computer system 206 in FIG. 2. In the illustrative example, landing manager 208 can be located in the vertical take-off and landing vehicle or can be in another location on a computer system at a remote location that is in communication with a vertical take-off and landing vehicle.

The process begins by determining a landing profile for landing a vertical take-off and landing vehicle using a third derivative of a position equation, an initial position, an initial speed, a final speed, and a touchdown point for the vertical take-off and landing vehicle (operation 1100).

The process performs a set of actions when a landing signal indicating that the vertical take-off and landing vehicle has landed is received from a sensor system and when the vertical take-off and landing vehicle reaches the touchdown point (operation 1102). The process terminates thereafter.

In the illustrative example, a landing profile with other landing detection mechanisms in a sensor system provides combining multiple sources that can be used to conclude that a vertical take-off and landing vehicle has touched down at a touchdown point, while also reducing or avoiding false touchdowns such as detecting a touchdown while the vertical take-off and landing vehicle is still in flight. The illustrative example enables a shut-down of the propulsion system or other actions when a touchdown is considered to have occurred.

The flowcharts and block diagrams in the different depicted examples illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
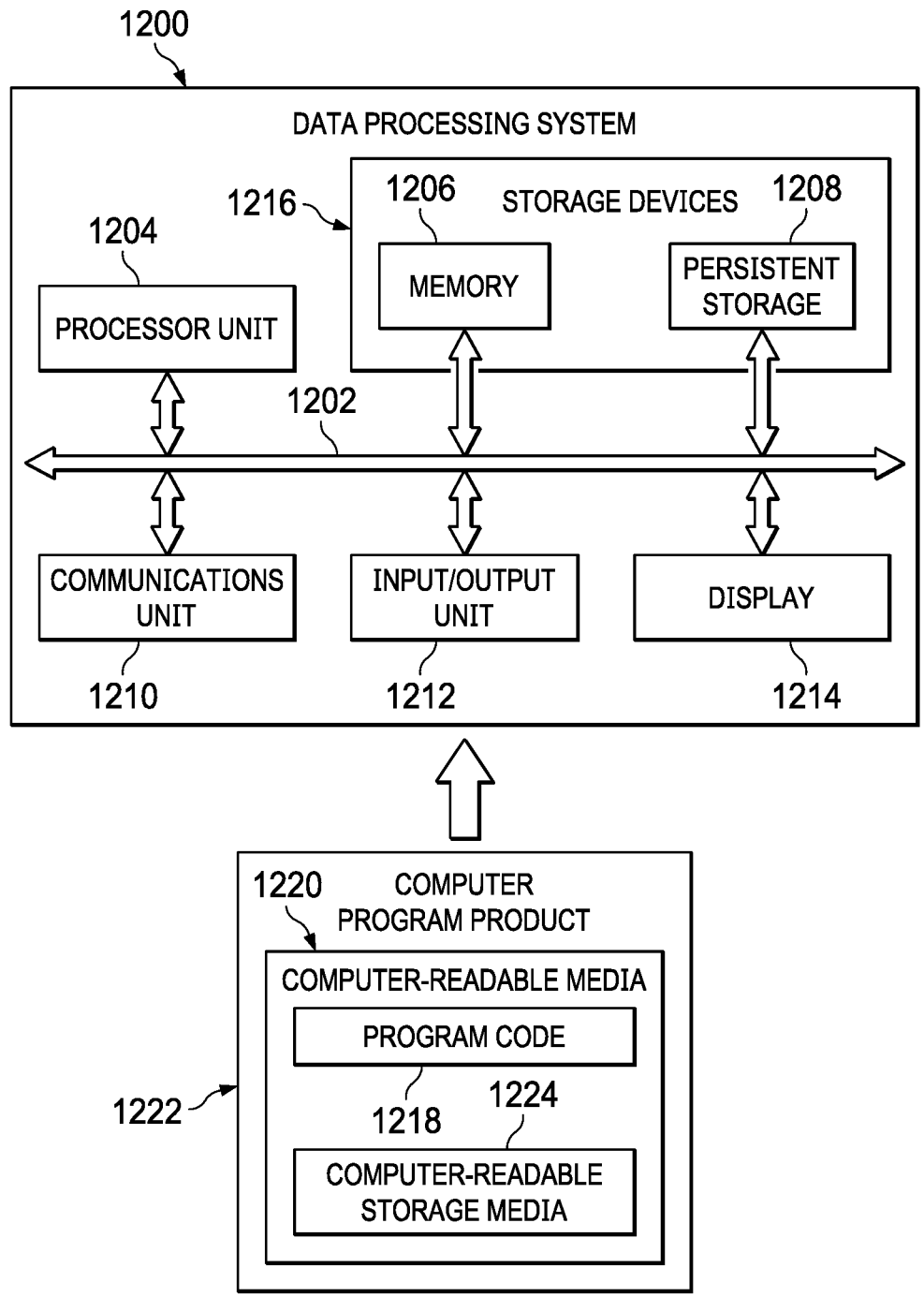
FIG. 12 is an illustration of a block diagram of a data processing system in accordance with an illustrative example.

Turning now to FIG. 12, an illustration of a block diagram of a data processing system is depicted in accordance with an illustrative example. Data processing system 1200 can be used to implement server computer 104, server computer 106, and client devices 110 in FIG. 1. Data processing system 1200 can also be used to implement computer system 206, controller 238, and data processing systems in vertical take-off and landing vehicle 204 in FIG. 2 and vertical take-off and landing vehicle 500 in FIG. 5. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 can take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 can provide a connection for user input through at least one of a keyboard, a mouse, or some other suitable input device. Further, input/output unit 1212 can send output to a printer. Display 1214 provides a mechanism to display information to a user.

Instructions for at least one of the operating system, applications, or programs can be located in storage devices 1216, which are in communication with processor unit 1204 through communications framework 1202. The processes of the different examples can be performed by processor unit 1204 using computer-implemented instructions, which can be located in a memory, such as memory 1206.

These instructions are referred to as program code, computer usable program code, or computer-readable program code that can be read and executed by a processor in processor unit 1204. The program code in the different examples can be embodied on different physical or computer-readable storage medium, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218. Computer-readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 can be transferred to data processing system 1200 using a computer-readable signal media. The computer-readable signal media are signals and can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different examples can be implemented. In some illustrative examples, one or more of the components may be incorporated in or otherwise form a portion of, another component. For example, memory 1206, or portions thereof, can be incorporated in processor unit 1204 in some illustrative examples. The different illustrative examples can be implemented in a data processing system including components in addition to or in place of those illustrated for data processing system 1200. Other components shown in FIG. 12 can be varied from the illustrative examples shown. The different examples can be implemented using any hardware device or system capable of running program code 1218.

Figure 13:
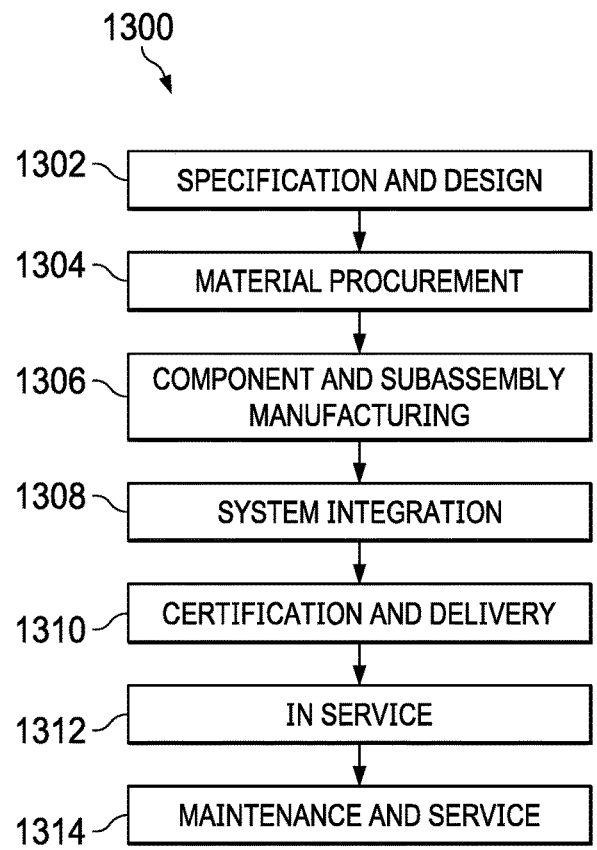
FIG. 13 is an illustration of an aircraft manufacturing and service method in accordance with an illustrative example.
Figure 14:
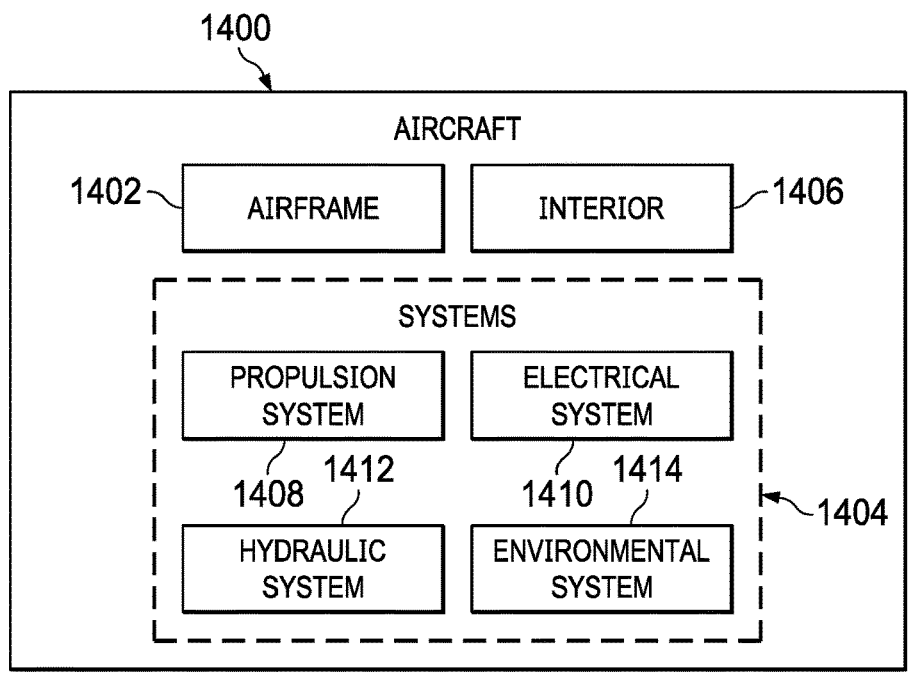
FIG. 14 is an illustration of a block diagram of an aircraft in which an illustrative example may be implemented.

Illustrative examples of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative example. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 can go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative example may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus examples, method examples, or a combination thereof can be utilized during production stages, such as component and subassembly manufacturing 1306 and system integration 1308 in FIG. 13. One or more apparatus examples, method examples, or a combination thereof may be utilized while aircraft 1400 is in service 1312, during maintenance and service 1314 in FIG. 13, or both. The use of a number of the different illustrative examples may substantially expedite the assembly of aircraft 1400, reduce the cost of aircraft 1400, or both expedite the assembly of aircraft 1400 and reduce the cost of aircraft 1400.

For example, one or more components of a vertical managing take-off system, such as a vertical take-off and landing system 202 in FIG. 2, can be implemented in aircraft 1400 during various stages of aircraft manufacturing and service method 1300 in FIG. 13. In one illustrative example, when aircraft 1400 is a vertical take-off and landing vehicle, and landing manager can be implemented in aircraft 1400 during at least one of system integration 1308, maintenance and service 1314, or in service 1312. When implemented during maintenance and service 1314, a landing manager can be added or installed during at least one of scheduled routine maintenance and service, modification, reconfiguration, refurbishment, and other maintenance or service.

Thus, the illustrative examples provide a method, apparatus, system, and computer program product for controlling landing of a vertical take-off and landing vehicle. In one illustrative example, a method controls landing of a vertical take-off and landing vehicle. A landing profile for landing the vertical take-off and landing vehicle is determined by a computer system using a third derivative of a position equation, an initial position, an initial speed, a final speed, and a touchdown point for the vertical take-off and landing vehicle. Landing of the vertical take-off and landing vehicle is controlled using the landing profile.

In the illustrative example, a landing manager can be used to determine when a vertical take-off and landing vehicle has landed and perform actions based on this determination. In one illustrative example, a landing profile is used in conjunction with receiving a landing signal indicating that the vertical take-off and landing vehicle has landed. This type of determination provides increased accuracy in performing the actions after landing in a manner that avoids issues with undesired environmental conditions such as turbulence and aerodynamic ground effects.

Thus, when a vertical landing and take-off system includes a sensor system and a landing manager, increased integrity or accuracy occurs at which landing of a vertical take-off and landing vehicle can be detected. This increased accuracy in detecting landing can provide at least one of reducing the time at which a vertical landing and take-off vehicle hovers, reducing false positive detections which may result in damage to the vertical take-off and landing vehicle, or increasing the ability for rapid recovery of the vertical landing and take-off vehicle.

The description of the different illustrative examples has been presented for purposes of illustration and description and is not intended to be exhaustive or limited to the examples in the form disclosed. The different illustrative examples describe components that perform actions or operations. In an illustrative example, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

Some features of the illustrative examples are described in the following clauses. These clauses are examples of features not intended to limit other illustrative examples.

Clause 1: A vertical landing system comprising a sensor system configured to generate a landing signal when landing of the vertical landing vehicle is detected by the sensor system; a computer system; a landing manager in the computer system, wherein the landing manager is configured to: determine a landing profile for landing the vertical landing vehicle using a third derivative of a position equation, an initial position, an initial speed, a final speed, and a touchdown point for the vertical landing vehicle, wherein a jerk is reduced in landing the vertical landing vehicle at the touchdown point; and perform a set of actions when the landing signal is received from the sensor system and when the vertical landing vehicle reaches the touchdown point.

Clause 2: The vertical landing system of Clause 1, wherein the landing manager is configured to control the landing of the vertical landing vehicle using the landing profile.

Clause 3: The vertical landing system of Clause 2, wherein in controlling the landing of the vertical landing vehicle at the touchdown point using the landing profile, the landing manager is configured to: send a set of commands to a controller for the vertical landing vehicle such that the set of commands causes the controller to control the vertical landing vehicle to follow the landing profile to land the vertical landing vehicle at the touchdown point.

Clause 4: The vertical landing system of any of Clauses 1-3, wherein in determining the landing profile for landing the vertical landing vehicle using the third derivative of the position equation, the initial position, the initial speed, the final speed, and the touchdown point for the vertical landing vehicle, the landing manager is configured to determine at least one of a position trajectory, a speed trajectory, or an acceleration trajectory using the following:

$$x(t) = a_0 + a_1 \Delta_t + a_2 \Delta_t^2 + a_3 \Delta_t^3 + a_4 \Delta_t^4 + a_5 \Delta_t^5$$

$$\dot{x}(t) = a_1 + 2a_2 \Delta_t + 3a_3 \Delta_t^2 + 4a_4 \Delta_t^3 + 5a_5 \Delta_t^4$$

$$\ddot{x}(t) = 2a_2 + 6a_3 \Delta_t + 12a_4 \Delta_t^2 20a_5 \Delta_t^3$$

$$\dddot{x}(t) = 6a_3 + 24a_4 \Delta_t + 60a_5 \Delta_t^2$$

where $x(t)$ is position, $\Delta_t \triangleq t - t_0$ is the time span since the initial condition and where t is time, $t_0$ is initial time, $a_0$ is initial position, $a_1$ is initial velocity, $a_2$ is initial acceleration times ½, and $a_3$, $a_4$, and as are determined by final conditions at touchdown.

Clause 5: The vertical landing system of any of Clauses 1-4, wherein in determining the landing profile for landing the vertical landing vehicle using third derivative of the position equation, the initial position, the initial speed, the final speed, and the touchdown point for the vertical landing vehicle, the landing manager is configured to repeatedly determine the landing profile for landing the vertical landing vehicle using the third derivative of the position equation, the initial position, the initial speed, the final speed, and the touchdown point for the vertical landing vehicle, wherein the initial position is a current position of the vertical landing vehicle and the initial speed is a current speed of the vertical take-off and landing vehicle.

Clause 6: The vertical landing system of any of Clauses 1-5, wherein the jerk is reduced to at least one of a minimum jerk or a desired level of jerk.

Clause 7: The vertical landing system of any of Clauses 1-6, wherein the set of actions is selected from at least one of turning off a propulsion system for the vertical landing vehicle or indicating that the vertical landing vehicle has landed.

Clause 8: The vertical landing system of any of Clauses 1-7, wherein the vertical landing vehicle is selected from one of a tiltrotor vehicle, a rotorcraft, a helicopter, a gyrodyne, a gyroplane, a tilt jet vertical landing aircraft, a direct-lift thrust vectoring aircraft, and a tilt wing aircraft.

Clause 9: A vertical landing system comprising a computer system; and a landing manager in the computer system, wherein the landing manager is configured to: determine a landing profile for landing a vertical landing vehicle using a third derivative of a position equation, an initial position, an initial speed, a final speed, and a touchdown point for the vertical landing vehicle, wherein landing of the vertical landing vehicle lands at the touchdown point using the landing profile.

Clause 10: The vertical landing system of Clause 9 further comprising a sensor system is configured to detect a landing of the vertical and landing vehicle, wherein the sensor system generates a landing signal when the landing of the vertical landing vehicle is detected by the sensor system; wherein the landing manager is configured to: perform a set of actions when the landing signal is received from the sensor system and when the vertical landing vehicle reaches the touchdown point.

Clause 11: The vertical landing system of Clause 9 or 10, wherein the landing manager is configured to control a landing of the vertical landing vehicle at the touchdown point using the landing profile.

Clause 12: The vertical landing system of Clause 11, wherein in controlling the landing of the vertical landing vehicle at the touchdown point using the landing profile, the landing manager is configured to send a set of commands to a controller for the vertical landing vehicle such that the set of commands cause the controller to control the vertical landing vehicle to follow the landing profile to land the vertical landing vehicle at the touchdown point.

Clause 13: The vertical landing system of any of Clauses 9-12, wherein the landing manager is configured to perform a set of actions when a landing signal indicating that the vertical landing vehicle has landed is received from a sensor system and when the vertical landing vehicle reaches the touchdown point.

Clause 14: The vertical landing system of any of Clauses 9-13, wherein in determining the landing profile for landing the vertical landing vehicle using the third derivative of the position equation, the initial position, the initial speed, the final speed, and the touchdown point for the vertical landing vehicle, the landing manager is configured to determine at least one of a position trajectory, a speed trajectory, or an acceleration trajectory using the following:

$$x(t) = a_0 + a_1(t-t_0) + a_2(t-t_0)^2 + a_3(t-t_0)^3 + a_4(t-t_0)^4 0 + a_5(t-t_0)^5$$

$$\dot{x}(t) = a_1 + 2a_2(t-t_0) + 3a_3(t-t_0)^2 + 4a_4(t-t_0)^3 + 5a_5(t-t_0)^4$$

$$\ddot{x}(t) = 2a_2 + 6a_3(t-t_0) + 12a_4(t-t_0)^2 + 20a_5(t-t_0)^3$$

$$\dddot{x}(t) = 6a_3 + 24a_4(t-t_0) + 60a_5(t-t_0)^2$$

where $x(t)$ is position, $\dot{x}(t)$ is velocity, $\ddot{x}(t)$ is acceleration, $\dddot{x}(t)$ is jerk, t is time, $t_0$ is initial time, $a_0$ is initial position, $a_1$ is initial velocity, and $a_2$ is initial acceleration times ½, and $a_3$, $a_4$, and as are determined by final conditions at touchdown.

Clause 15: The vertical landing system of any of Clauses 9-14, wherein in determining the landing profile for landing the vertical landing vehicle using the third derivative of the position equation, the initial position, the initial speed, the final speed, and the touchdown point for the vertical landing vehicle, the landing manager is configured to repeatedly determine the landing profile for landing the vertical landing vehicle using the third derivative of the position equation, the initial position, the initial speed, the final speed, and the touchdown point for the vertical landing vehicle, wherein the initial position is a current position of the vertical landing vehicle and the initial speed is a current speed of the vertical landing vehicle.

Clause 16: The vertical landing system of any of Clauses 9-15, wherein a jerk is reduced in landing the vertical landing vehicle at the touchdown point.

Clause 17: The vertical landing system of Clause 16, wherein the jerk is reduced to at least one of a minimum jerk or a desired level of jerk.

Clause 18: The vertical landing system of Clause 13, wherein the set of actions is selected from at least one of turning off a propulsion system for the vertical landing vehicle, or indicating that the vertical landing vehicle has landed.

Clause 19: The vertical landing system of any of Clauses 9-18, wherein the vertical landing vehicle is selected from one of a tiltrotor vehicle, a rotorcraft, a helicopter, a gyrodyne, a gyroplane, a tilt jet vertical take-off and landing aircraft, a direct-lift thrust vectoring aircraft, and a tilt wing aircraft.

Clause 20: A method for controlling landing of a vertical landing vehicle, the method comprising determining, by a computer system, a landing profile for landing the vertical landing vehicle using a third derivative of a position equation, an initial position, an initial speed, a final speed, and a touchdown point for the vertical landing vehicle; and controlling landing of the vertical landing vehicle using the landing profile.

Clause 21: The method of Clause 20, wherein controlling of the vertical landing vehicle at the touchdown point using the landing profile comprises sending, by the computer system, a set of commands to a controller for the vertical landing vehicle such that the set of commands causes the controller to control the vertical landing vehicle to follow the landing profile to land the vertical landing vehicle at the touchdown point.

Clause 22: The method of Clause 20 or 21, further comprising performing, by the computer system, a set of actions when a landing signal indicating that the vertical landing vehicle has landed is received from a sensor system and when the vertical landing vehicle reaches the touchdown point.

Clause 23: The method of any of Clauses 20-22, wherein determining, by the computer system the landing profile for landing the vertical landing vehicle using the third derivative of the position equation, the initial position, the initial speed, the final speed, and the touchdown point for the vertical landing vehicle comprises determining, by the computer system, at least one of a position trajectory, a speed trajectory, or an acceleration trajectory using the following:

$$x(t)=a_0+a_1(t-t_0)+a_2(t-t_0)^2+a_3(t-t_0)^3+a_4(t-t_0)^4+a_5(t-t_0)^5$$

$$\dot{x}(t)=a_1+2a_2(t-t_0)+3a_3(t-t_0)^2+4a_4(t-t_0)^3+5a_5(t-t_0)^4$$

$$\ddot{x}(t)=2a_2+6a_3(t-t_0)+12a_4(t-t_0)^2+20a_5(t-t_0)^3$$

$$\dddot{x}(t)=6a_3+24a_4(t-t_0)+60a_5(t-t_0)^2$$

where $x(t)$ is position, $\dot{x}(t)$ is velocity, $\ddot{x}(t)$ is acceleration, $\dddot{x}(t)$ is jerk, t is time, $t_0$ is initial time, $a_0$ is initial position, $a_1$ is initial velocity, and $a_2$ is initial acceleration times ½, and $a_3$, $a_4$, and as are determined by final conditions at touchdown.

Clause 24: The method of any of Clauses 20-23, wherein determining, by the computer system, the landing profile for landing the vertical landing vehicle using the third derivative of the position equation, the initial position, the initial speed, the final speed, and the touchdown point for the vertical landing vehicle comprises repeatedly determining, by the computer system, the landing profile for landing the vertical landing vehicle using the third derivative of the position equation, the initial position, the initial speed, the final speed, and the touchdown point for the vertical landing vehicle, wherein the initial position is a current position of the vertical landing vehicle and the initial speed is a current speed of the vertical landing vehicle.

Clause 25: The method of any of Clauses 20-24, wherein a jerk is reduced in landing the vertical landing vehicle at the touchdown point.

Clause 26: The method of Clause 25, wherein the jerk is reduced to at least one of a minimum jerk or a desired level of jerk.

Clause 27: The method of Clause 22, wherein the set of actions is selected from at least one of turning off a propulsion system for the vertical landing vehicle or indicating that the vertical landing vehicle has landed.

Clause 28: The method of any of Clauses 20-27, wherein the vertical landing vehicle is selected from one of a tiltrotor vehicle, a rotorcraft, a helicopter, a gyrodyne, a gyroplane, a tilt jet vertical landing aircraft, a direct-lift thrust vectoring aircraft, and a tilt wing aircraft.

Clause 29: A computer program product for controlling landing of a vertical landing vehicle, the computer program product comprising a computer-readable storage media; first program code, stored on the computer-readable storage media, executable by a computer system to cause the computer system to determine a landing profile for landing the vertical landing vehicle using a third derivative of a position equation, an initial position, an initial speed, a final speed, and a touchdown point for the vertical landing vehicle; and second first program code, stored on the computer-readable storage media, executable by the computer system to cause the computer system to control landing of the vertical landing vehicle using the landing profile.

What is claimed is:

1. A vertical landing system that comprises:
a computer system that comprises a landing manager; and
an electromechanical sensing device, an ultrasonic sensor, and an additional sensor, each configured to detect a landing of a vertical landing vehicle, and responsive thereto generate and send a landing signal to the computer system, wherein the landing manager is configured to:
receive inputs that comprise: a desired final speed, a desired final position, an initial position, an initial speed, and an initial acceleration;
determine, based upon periodic updates in real-time, a landing profile for the vertical landing vehicle that minimizes a jerk that acts on the vertical landing vehicle in a descend and deceleration phase prior to a touchdown point that is derived from a gain adjusted velocity and a gain adjusted acceleration in a real-time open-loop, wherein the landing profile is derived from: a third derivative of a position equation, the initial position, the initial speed, the desired final speed, and the desired final position for the vertical landing vehicle;
determine that the vertical landing vehicle is located at the touchdown point of the landing profile; and
responsive to a reception of the landing signal from all of: the electromechanical sensing device, the ultrasonic sensor, and the additional sensor, and the determination that the vertical landing vehicle is located at the touchdown point of the landing profile, indicate that the vertical landing vehicle has landed and turn off a propulsion system of the vertical landing vehicle.

2. The vertical landing system of claim 1, wherein:
the additional sensor is not located on the vertical landing vehicle; and
the landing manager is configured to control the landing of the vertical landing vehicle using the landing profile.

3. The vertical landing system of claim 2, wherein the landing manager is further configured to:
send a set of commands based upon the landing profile to a controller for the vertical landing vehicle such that the set of commands causes the controller to control the vertical landing vehicle to follow the landing profile to land the vertical landing vehicle at the touchdown point.

4. The vertical landing system of claim 3, wherein the controller is further configured to provide an estimate, based upon the landing profile, of a tilt angle required to decelerate the vertical landing vehicle into a hover.

5. The vertical landing system of claim 1, wherein the landing manager is further configured to determine at least one of: a position trajectory, a speed trajectory, or an acceleration trajectory using at least one of the following:

$$x(t)=a_0+a_1\Delta_t+a_2\Delta_t^2+a_3\Delta_t^3+a_4\Delta_t^4+a_5\Delta_t^5$$

$$\dot{x}(t)=a_1+2a_2\Delta_t+3a_3\Delta_t^2+4a_4\Delta_t^3+5a_5\Delta_t^4$$

$$\ddot{x}(t)=2a_2+6a_3\Delta_t+12a_4\Delta_t^2+20a_5\Delta_t^3$$

$$\dddot{x}(t)=6a_3+24a_4\Delta_t+60a_5\Delta_t^2$$

where x(t) is position, $\Delta_t \triangleq t-t_0$ is a time span since an initial condition and where t is time, $t_0$ is initial time, $a_0$ is initial position, $a_1$ is initial speed, $a_2$ is initial acceleration times ½, and $a_3$, $a_4$, and as are determined by final conditions at touchdown.

6. The vertical landing system of claim 1, wherein the landing manager is further configured to repeatedly determine the landing profile for landing the vertical landing vehicle using the third derivative of the position equation, the initial position, the initial speed, the desired final speed, and the touchdown point for the vertical landing vehicle, wherein the initial position is a current position of the vertical landing vehicle and the initial speed is a current speed of the vertical landing vehicle.

7. The vertical landing system of claim 1, further comprising a touchdown point sensor configured to sense when the vertical landing vehicle is at the touchdown point, wherein the vertical landing vehicle is selected from one of a tiltrotor vehicle, a rotorcraft, a helicopter, a gyrodyne, a gyroplane, a tilt jet vertical landing aircraft, a direct-lift thrust vectoring aircraft, and a tilt wing aircraft.

8. The vertical landing system of claim 1, wherein the additional sensor system comprises a light detection and ranging system.

9. A vertical landing system that comprises:
a computer system that comprises a landing manager; and
an electromechanical sensing device, an ultrasonic sensor, and an additional sensor, each configured to detect a landing of a vertical landing vehicle, and responsive thereto generate and send a landing signal to the computer system, wherein the landing manager is configured to:
determine, based on periodic updates in real-time, a landing profile for landing a vertical landing vehicle that minimizes a jerk that acts on the vertical landing vehicle in a descend and deceleration phase prior to a touchdown point that is derived from a gain adjusted velocity and a gain adjusted acceleration in a real-time open-loop, wherein the landing profile is based upon: a third derivative of a position equation, an initial position, an initial speed, a desired final speed, and a desired final position for the vertical landing vehicle;
communicate with a controller to land the vertical landing vehicle at the touchdown point of the landing profile based upon the landing profile; and
responsive to a reception of the landing signal from all of: the electromechanical sensing device, the ultrasonic sensor, and the additional sensor and a determination in the landing manager that the vertical landing vehicle is located at the touchdown point of the landing profile, indicate that the vertical landing vehicle has landed and turn off a propulsion system of the vertical landing vehicle.

10. The vertical landing system of claim 9, wherein the landing manager is configured to:
control a landing of the vertical landing vehicle at the touchdown point based upon the landing profile.

11. The vertical landing system of claim 10, wherein the landing manager is configured to send a set of commands based upon the landing profile to the controller for the vertical landing vehicle such that the set of commands cause the controller to control the vertical landing vehicle to follow the landing profile to land the vertical landing vehicle at the touchdown point.

12. The vertical landing system of claim 9, wherein in determining the landing profile for landing the vertical landing vehicle using the third derivative of the position equation, the initial position, the initial speed, the desired final speed, and the touchdown point for the vertical landing vehicle, the landing manager is configured to determine at least one: of a position trajectory, a speed trajectory, or an acceleration trajectory using at least one of the following:

$$x(t)=a_0+a_1(t-t_0)+a_2(t-t_0)^2+a_3(t-t_0)^3+a_4(t-t_0)^4+a_5(t-t_0)^5$$

$$\dot{x}(t)=a_1+2a_2(t-t_0)+3a_3(t-t_0)^2+4a_4(t-t_0)^3+5a_5(t-t_0)^4$$

$$\ddot{x}(t)=2a_2+6a_3(t-t_0)+12a_4(t-t_0)^2+20a_5(t-t_0)^3$$

$$\dddot{x}(t)=6a_3+24a_4(t-t_0)+60a_5(t-t_0)^2$$

where x(t) is position, $\dot{x}(t)$ is velocity, $\ddot{x}(t)$ is acceleration, $\dddot{x}(t)$ is jerk, t is time, $t_0$ is initial time, $a_0$ is initial position, $a_1$ is initial speed, and $a_2$ is initial acceleration times ½, and $a_3$, $a_4$, and $a_5$ are determined by final conditions at touchdown.

13. The vertical landing system of claim 9, wherein the landing manager is further configured to:
repeatedly determine the landing profile for landing the vertical landing vehicle using the third derivative of the position equation, the initial position, the initial speed, the desired final speed, and the touchdown point for the vertical landing vehicle, wherein the initial position is a current position of the vertical landing vehicle and the initial speed is a current speed of the vertical landing vehicle.

14. The vertical landing system of claim 9, wherein the controller is further configured to provide an estimate, based upon the landing profile, of a tilt angle required to decelerate the vertical landing vehicle into a hover.

15. A method for controlling landing of a vertical landing vehicle, the method comprising:
receiving, in a landing manager in a computer system in the vertical landing vehicle:
from an electromechanical sensing device, an ultrasonic sensor, and an additional sensor on the vertical landing vehicle, respectively, a landing signal; and
inputs comprising: a desired final speed, a desired final position, an initial position, an initial speed, and an initial acceleration, for the vertical landing vehicle;
deriving, in the landing manager using a gain adjusted velocity and a gain adjusted acceleration in a real-time open-loop and minimized in a descend and deceleration phase prior to a touchdown point, a jerk of the vertical landing vehicle;

determining, based upon periodic updates in real time by the computer system using: a third derivative of a position equation, the initial position, the initial speed, the desired final speed, and the touchdown point for the vertical landing vehicle, a landing profile for landing the vertical landing vehicle;

controlling landing of the vertical landing vehicle using the landing profile;

determining, in the computer system, that the vertical landing vehicle is located at the touchdown point of the landing profile; and using the landing signal from all of: the electromechanical sensing device, the ultrasonic sensor, and the additional sensor, determining and indicating that the vertical landing vehicle landed at the touchdown point of the landing profile; and turning off a propulsion system of the vertical landing vehicle.

16. The method of claim 15, further comprising sending, by the computer system, a set of commands based upon the landing profile to a controller for the vertical landing vehicle such that the set of commands causes the controller to control the vertical landing vehicle to follow the landing profile to land the vertical landing vehicle at the touchdown point.

17. The method of claim 15, further comprising performing, by the computer system, a set of actions when the landing signal indicating that the vertical landing vehicle has landed is received and when the vertical landing vehicle reaches the touchdown point.

18. The method of claim 15, further comprising the controller using the landing profile and estimating a tilt angle required to decelerate the vertical landing vehicle into a hover.

19. A computer program product for controlling landing of a vertical landing vehicle, wherein the computer program product comprises:

a computer-readable non-transitory storage media;

first program code, stored on the computer-readable non-transitory storage media, executable by a computer system to cause the computer system to:

receive a landing signal from: an electromechanical sensing device, an ultrasonic sensor, and an additional sensor, each configured to detect a landing of a vertical landing vehicle, and responsive thereto generate and send the landing signal; and determine, based upon periodic updates in real-time, a landing profile for landing the vertical landing vehicle based upon: a third derivative of a position equation, an initial position, an initial speed, a final speed, and a touchdown point for the vertical landing vehicle, wherein a jerk in a descend and deceleration phase prior to landing of the vertical landing vehicle is derived from a gain adjusted velocity and a gain adjusted acceleration in a real-time open-loop and minimized, and the vertical landing vehicle lands at the touchdown point based upon the landing profile; and second program code, stored on the computer-readable non-transitory storage media, executable by the computer system to cause the computer system to control landing of the vertical landing vehicle based upon the landing profile and responsive to a reception of the landing signal from all of: the electromechanical sensing device, the ultrasonic sensor, and the additional sensor and a determination that the vertical landing vehicle is located at the touchdown point of the landing profile, indicate that the vertical landing vehicle has landed and turn off a propulsion system of the vertical landing vehicle.

20. The computer program product for controlling landing of a vertical landing vehicle of claim 19, further comprising the second program code configured to provide the landing profile to a controller configured to provide an estimate of a tilt angle required to decelerate the vertical landing vehicle into a hover.

* * * * *

UNITED STATES PATENT AND TRADEMARK OFFICE
CERTIFICATE OF CORRECTION

Page 1 of 1

PATENT NO. : 12,416,929 B2
APPLICATION NO. : 17/456834
DATED : September 16, 2025
INVENTOR(S) : Rolf Rysdyk, Joseph Jackson and Jeffrey Decker It is certified that error appears in the above-identified patent and that said Letters Patent is hereby corrected as shown below:

In the Claims

Column 27, Line 16, Claim 5 correct "++3" to read -- +3 --;
Column 27, Line 18, Claim 5 correct "$\Delta_t^{24}$" to read -- $\Delta_t^2$ --;
Column 27, Line 20, Claim 5 correct "[|$]$¨ ¨$$[|$]$¨ A$\ddot{p}\ddot{x}$(t)" to read -- $\dddot{x}(t)$ --;
Column 27, Line 21, Claim 5 correct "position, $\Delta_t \triangleq t-t_0$ is a time" to read -- position, $\Delta_t \triangleq t-t_0$ is a time --;
Column 27, Line 25, Claim 5 correct "and as are determined" to read -- and $a_5$ are determined --;
Column 28, Line 29, Claim 6 correct "$+_a(t-t_0)^4$" to read -- $+a_4(t-t_0)^4$ --;
Column 28, Line 35, Claim 6 correct "[|$]$¨ ¨$$[|$]$¨ A$\ddot{p}\ddot{x}$(t)=6$a_3$+24$a_4$(t-$t_0$)+60$a_5$(t-$t_0$)$^2$" to read -- $\dddot{x}(t)$=6$a_3$+24$a_4$(t-$t_0$)+60$a_5$(t-$t_0$)$^2$ --;
Column 28, Line 38, Claim 12 correct "[|$]$¨ ¨$$[|$]$¨ A$\ddot{p}\ddot{x}$(t) is jerk," to read -- $\dddot{x}(t)$ is jerk, --.

Signed and Sealed this
Fourteenth Day of October, 2025

John A. Squires
*Director of the United States Patent and Trademark Office*